United States Patent
Mattson et al.

(10) Patent No.: US 9,214,759 B2
(45) Date of Patent: *Dec. 15, 2015

(54) CONNECTOR WITH SLIDEABLE RETENTION FEATURE AND PATCH CORD HAVING THE SAME

(71) Applicant: ADC Telecommunications, Inc., Berwyn, PA (US)

(72) Inventors: Loren J. Mattson, Richfield, MN (US); Gordon John White, Gloucester (GB)

(73) Assignee: ADC Telecommunications, Inc., Berwyn, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/230,496

(22) Filed: Mar. 31, 2014

(65) Prior Publication Data

US 2014/0305700 A1  Oct. 16, 2014

Related U.S. Application Data

(63) Continuation of application No. 13/528,273, filed on Jun. 20, 2012, now Pat. No. 8,684,763.

(60) Provisional application No. 61/499,475, filed on Jun. 21, 2011.

(51) Int. Cl.
| | |
|---|---|
| *H01R 13/56* | (2006.01) |
| *H01R 13/58* | (2006.01) |
| *H01B 13/22* | (2006.01) |
| *H04Q 1/02* | (2006.01) |
| *H01B 11/00* | (2006.01) |
| *H01R 43/20* | (2006.01) |
| *H01R 9/03* | (2006.01) |

(52) U.S. Cl.
CPC ............... *H01R 13/58* (2013.01); *H01B 11/00* (2013.01); *H01B 13/22* (2013.01); *H01R 13/5829* (2013.01); *H01R 43/20* (2013.01); *H04Q 1/135* (2013.01); *H01R 9/035* (2013.01); *Y10T 29/49117* (2015.01)

(58) Field of Classification Search
CPC ........................... H01R 13/562; H01R 13/501
USPC .................................. 439/447, 467, 460, 465
See application file for complete search history.

(56) References Cited

U.S. PATENT DOCUMENTS

| | | |
|---|---|---|
| 835,003 A | 11/1906 | Svensson |
| 2,434,475 A | 1/1948 | Sullivan |
| 2,552,414 A | 5/1951 | Eriksen et al. |

(Continued)

OTHER PUBLICATIONS

International Search Report and Written Opinion mailed Jan. 2, 2013 for PCT Application No. PCT/US2012/042463, which relates to copending U.S. Appl. No. 13/524,938, filed Jun. 15, 2012, and titled "Connector with Cable Retention Feature and Patch Cord Having the Same."

(Continued)

*Primary Examiner* — Phuongchi T Nguyen
(74) *Attorney, Agent, or Firm* — Merchant & Gould P.C.

(57) ABSTRACT

A patch cord including a connector attached to an end of an electrical cable. The connector includes a boot member that slides over a portion of a wire manager to actuate a retention arrangement of the connector. Certain types of retention arrangements are actuated by deflecting flexible tabs of the wire manager inwardly to bite into at least an outer jacket of the electrical cable.

19 Claims, 24 Drawing Sheets

(56) References Cited

U.S. PATENT DOCUMENTS

| | | |
|---|---|---|
| 3,001,169 A | 9/1961 | Blonder |
| 3,601,766 A | 8/1971 | Alibert |
| 3,710,005 A | 1/1973 | French |
| 4,408,822 A | 10/1983 | Nikitas |
| 4,737,122 A | 4/1988 | Dechelette |
| 5,186,649 A | 2/1993 | Fortner et al. |
| 5,195,906 A | 3/1993 | Szegda |
| 5,389,012 A | 2/1995 | Huang |
| 5,393,244 A | 2/1995 | Szegda |
| 5,531,618 A | 7/1996 | Market |
| 5,877,452 A | 3/1999 | McConnell |
| 6,017,237 A | 1/2000 | Sullivan |
| 6,019,635 A | 2/2000 | Nelson |
| 6,293,824 B1 | 9/2001 | Guerin et al. |
| 6,323,427 B1 | 11/2001 | Rutledge |
| 6,371,794 B1 | 4/2002 | Bauer et al. |
| 6,439,911 B1 | 8/2002 | Conorich |
| 6,495,755 B2 | 12/2002 | Burton et al. |
| 6,641,443 B1 | 11/2003 | Itano et al. |
| 6,705,884 B1 * | 3/2004 | McCarthy .................. 439/394 |
| 6,786,776 B2 | 9/2004 | Itano et al. |
| 6,840,803 B2 | 1/2005 | Wlos et al. |
| 6,878,009 B2 | 4/2005 | Amemiya |
| 6,953,362 B2 | 10/2005 | Mössner et al. |
| 6,981,887 B1 | 1/2006 | Mese et al. |
| 7,025,621 B2 | 4/2006 | Mössner et al. |
| 7,115,815 B2 | 10/2006 | Kenny et al. |
| 7,144,272 B1 | 12/2006 | Burris et al. |
| 7,173,189 B1 | 2/2007 | Hazy et al. |
| 7,214,884 B2 | 5/2007 | Kenny et al. |
| 7,229,309 B2 | 6/2007 | Carroll et al. |
| 7,270,563 B2 | 9/2007 | Mossner et al. |
| 7,271,342 B2 | 9/2007 | Stutzman et al. |
| 7,375,284 B2 | 5/2008 | Stutzman et al. |
| 7,411,131 B2 | 8/2008 | Stutzman |
| 7,413,466 B2 | 8/2008 | Clark et al. |
| 7,549,891 B2 | 6/2009 | Mössner et al. |
| 7,712,214 B2 | 5/2010 | Clark et al. |
| 8,083,551 B2 | 12/2011 | Hetzer et al. |
| 8,137,126 B2 | 3/2012 | Clark et al. |
| 8,435,083 B2 | 5/2013 | Hetzer et al. |
| 8,684,763 B2 | 4/2014 | Mattson et al. |
| 2003/0199192 A1 | 10/2003 | Caveney et al. |
| 2005/0087357 A1 | 4/2005 | Steinich |
| 2005/0092515 A1 | 5/2005 | Kenny et al. |
| 2005/0106929 A1 | 5/2005 | Meckley et al. |
| 2005/0153603 A1 | 7/2005 | AbuGhazaleh et al. |
| 2005/0202697 A1 | 9/2005 | Caveney et al. |
| 2005/0287873 A1 | 12/2005 | Carroll et al. |
| 2007/0144762 A1 | 6/2007 | Stutzman et al. |
| 2008/0057778 A1 * | 3/2008 | Clark et al. .................. 439/502 |
| 2008/0220658 A1 | 9/2008 | Caveney et al. |
| 2008/0318476 A1 | 12/2008 | Weber et al. |
| 2009/0275228 A1 | 11/2009 | Henry et al. |
| 2011/0115494 A1 | 5/2011 | Taylor et al. |
| 2012/0329320 A1 | 12/2012 | Taylor et al. |

OTHER PUBLICATIONS

Catalog from Plug Master Industrial Co., Ltd., E205572, pp. 1-31 (2004).

* cited by examiner

CONNECTOR WITH SLIDEABLE RETENTION FEATURE AND PATCH CORD HAVING THE SAME

CROSS-REFERENCE TO RELATED APPLICATIONS

This application is a continuation of application Ser. No. 13/528,273, filed Jun. 20, 2012, now U.S. Pat. No. 8,684,763, which application claims the benefit of U.S. Provisional Application No. 61/499,475, filed Jun. 21, 2011, and titled "Connector with Slideable Retention Feature and Patch Cord Having the Same," which applications are incorporated herein by reference in their entirety.

TECHNICAL FIELD

The present disclosure relates generally to cables for use in the telecommunications industry, and various methods associated with such cables. More particularly, this disclosure relates to telecommunication patch cords.

BACKGROUND

The telecommunications industry utilizes cabling in a wide range of applications. Some cabling arrangements include twisted pairs of insulated conductors, the pairs being twisted about each other to define a twisted pair core. An insulating jacket is typically extruded over the twisted pair core to maintain the configuration of the core, and to function as a protective layer. Such cabling is commonly referred to as a multi-pair cable.

Multi-pair cables are used in many applications; for example, patch cords often utilize multi-pair cables. Patch cords include connectors secured to each end of a multi-pair cable and are used to provide electrical interconnections between two pieces of equipment. The connectors are typically clamped onto the ends of the multi-pair cable.

Conventional patch cord connectors, such as RJ45 type connectors, often cannot meet the stringent electrical requirements associated with high speed signal transmission applications. Such electrical requirements can concern, for example, alien crosstalk arising from high speed signal transmissions. In most cases, the inability to meet the electrical requirements is due at least in part to inadequate retention of the connector in relation to the cable and/or cable jacket. Inadequate retention of the connector causes distortion in both the twisted pair core as well as the individual pairs of the multi-pair cable, which in turn adversely affects electrical performance.

To address the above retention problem, some more recent connector arrangements include additional securing components. The additional securing components, however, increase the manufacturing cost of both the connector and the cable in terms of added materials, machining or molding, and assembly.

In general, improvement has been sought with respect to such connector and cable arrangements, generally to improve attachment of a connector to a multi-pair cable, and related assembly processes.

SUMMARY

One aspect of the present disclosure relates to a patch cord. The patch cord includes a connector attached to an end of a multi-pair cable. The connector includes a retention arrangement that engages a jacket of the multi-pair cable. Still another aspect of the present disclosure relates to a method of assembling a patch cord having a connector with a retention arrangement. A further aspect of the present disclosure relates to a multi-pair cable connector having a retention arrangement for retaining the connector on a multi-pair cable.

A variety of examples of desirable product features or methods are set forth in part in the description that follows, and in part will be apparent from the description, or may be learned by practicing various aspects of the disclosure. The aspects of the disclosure may relate to individual features as well as combinations of features. It is to be understood that both the foregoing general description and the following detailed description are explanatory only, and are not restrictive of the claimed invention.

DETAILED DESCRIPTION

Reference will now be made in detail to various features of the present disclosure that are illustrated in the accompanying drawings. Wherever possible, the same reference numbers will be used throughout the drawings to refer to the same or like parts.

A. Introduction

In general, the present disclosure relates to a connector having a slide-on retention arrangement that retains the connector in relation to an end of a cable. The retention arrangement makes the connector easy to assemble onto a multi-jacket cable, requires no additional parts, and does not adversely affect the electrical performance of the cable's core or twisted pairs.

As will be described in greater detail hereinafter, the retention arrangement of the presently disclosed connector includes flexible tabs that slide over a double-layered jacket of a cable during installation and bite into the jacket when the connector is assembled. In some implementations, the retention arrangement is designed to inhibit longitudinal movement of an outer jacket of the cable without disturbing the cable core or the individual twisted pairs. In certain implementations, the retention arrangement is designed also to inhibit longitudinal movement of an inner jacket of the cable. In addition to providing improved connector retention, the retention arrangement also has the affect of providing a secure strain relief feature for the cable exiting the connector.

Figure 1:
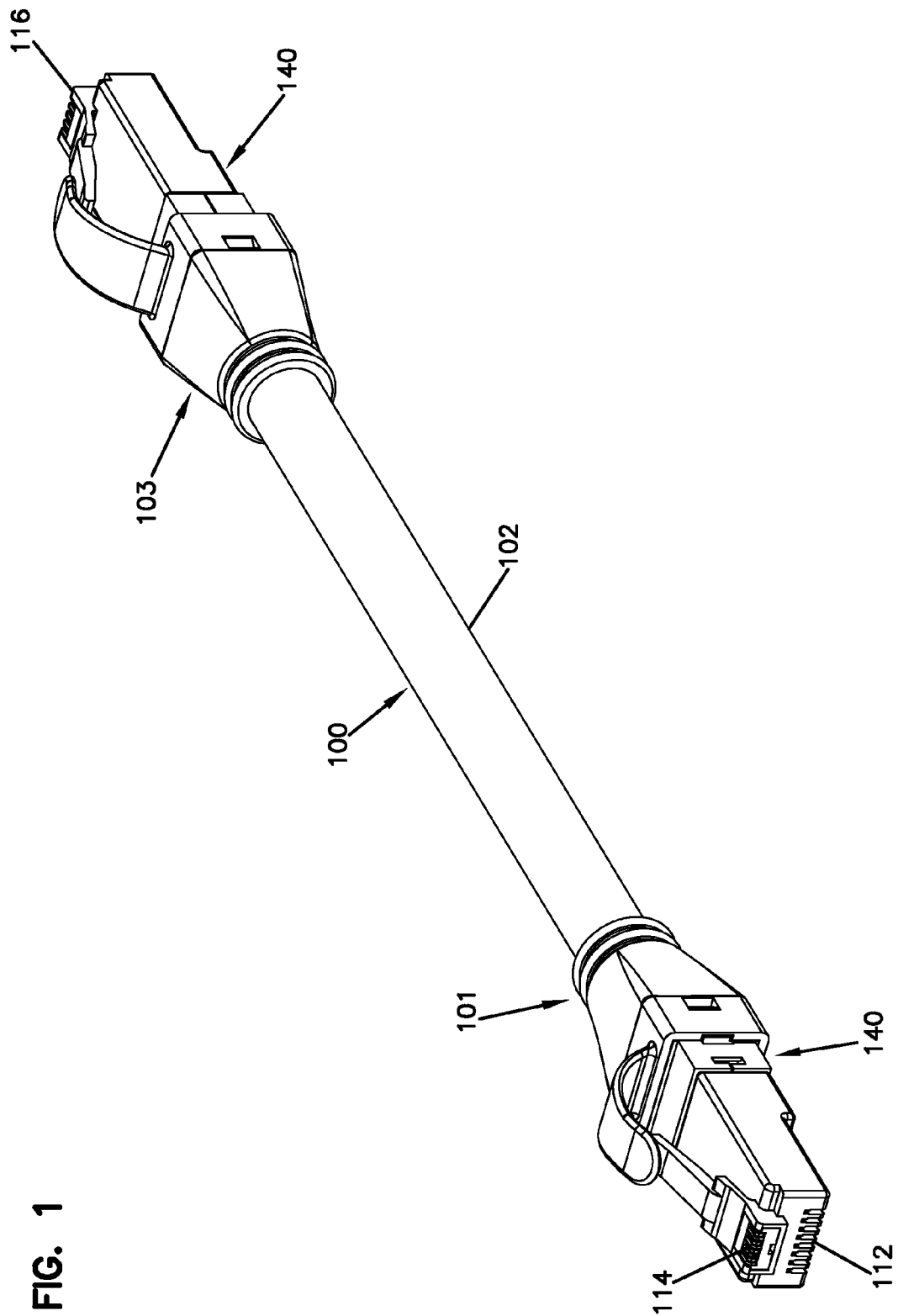
FIG. 1 is a top perspective view of one example implementation of a patch cord, including a multi-pair cable and connectors, in accordance with the principles of the present disclosure.
Figure 2:
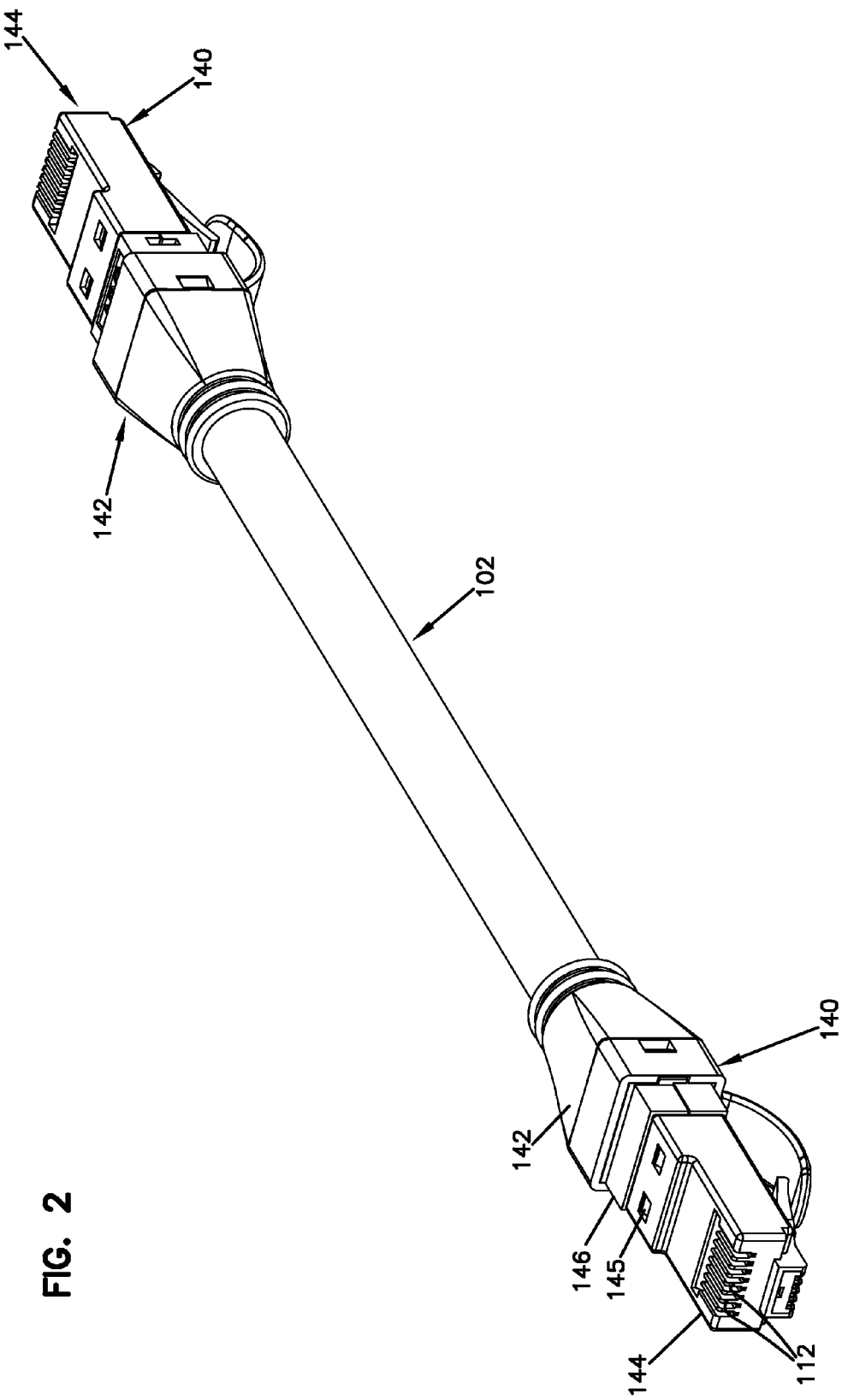
FIG. 2 is a bottom perspective view of the patch cord of FIG. 1.

Referring to FIGS. 1 and 2, one example implementation of a patch cord 100 having features that are examples of how inventive aspects of the present disclosure may be practiced, is illustrated. The patch cord 100 generally includes a cable 102 having a first end 101 and a second end 103 (see FIG. 3). First and second connectors 140 are attached to the ends 101, 103 of the cable 102.

B. Multi-Pair Cable, Generally

Figure 3:
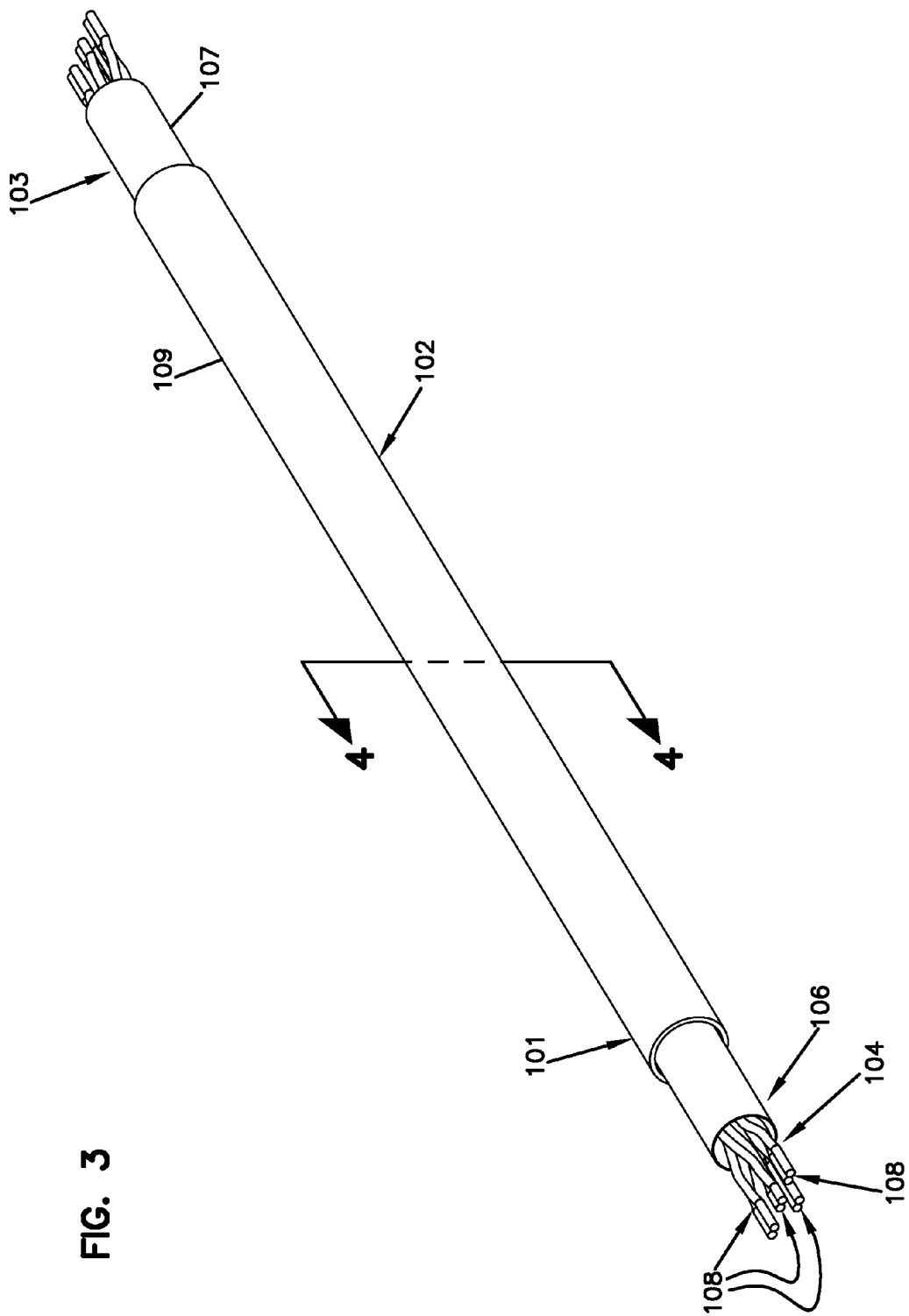
FIG. 3 is a perspective view of the multi-pair cable of the patch cord of FIG. 1, shown in isolation.
Figure 4:
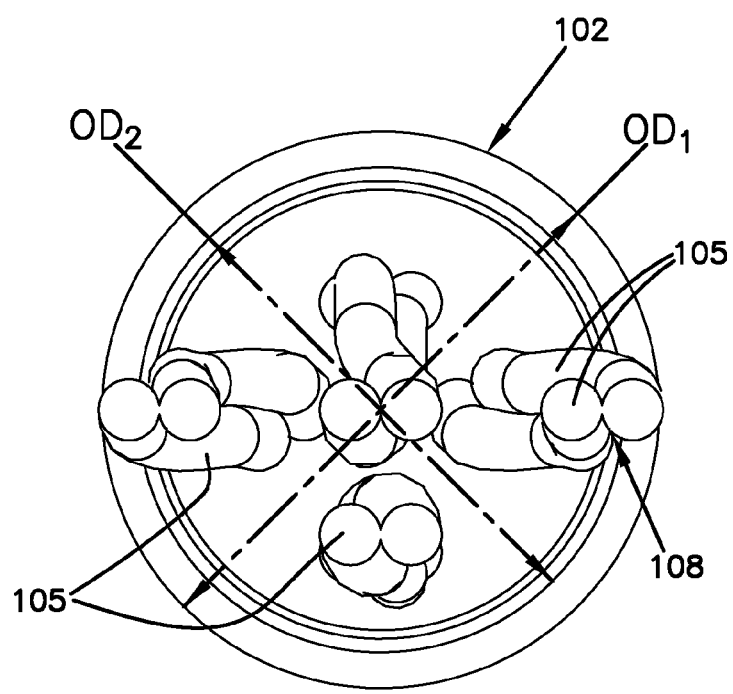
FIG. 4 is a schematic, cross-sectional view of the multi-pair cable of FIG. 3, taken along line 4-4.
Figure 5:
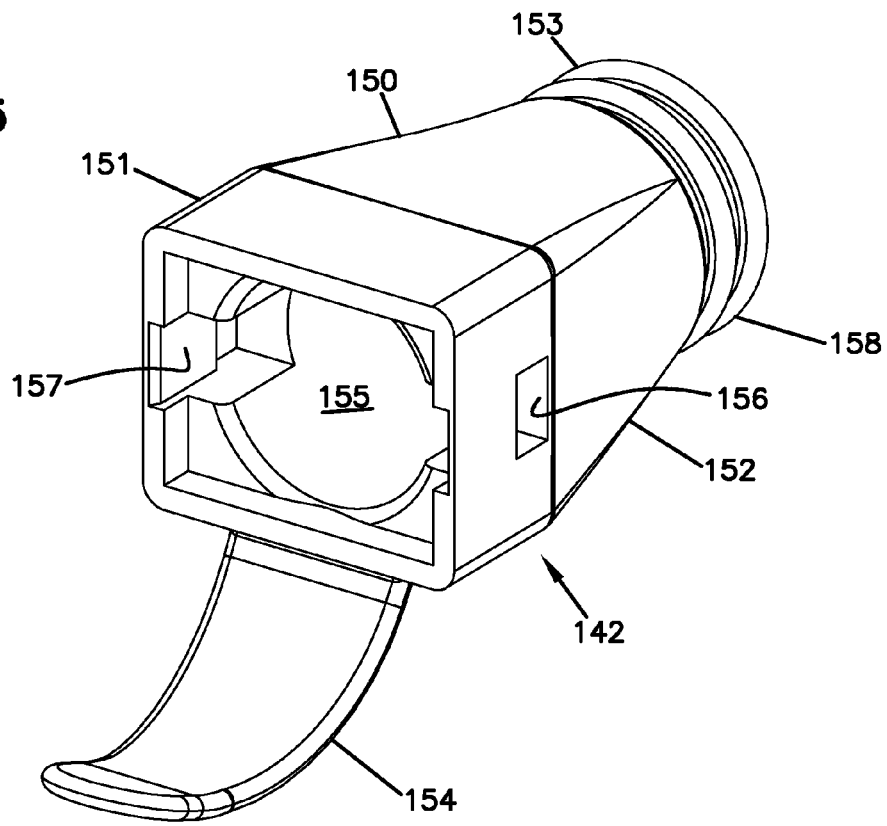
FIG. 5 is a front, bottom perspective view of a boot member of one of the connectors of FIG. 1, shown in isolation.
Figure 6:
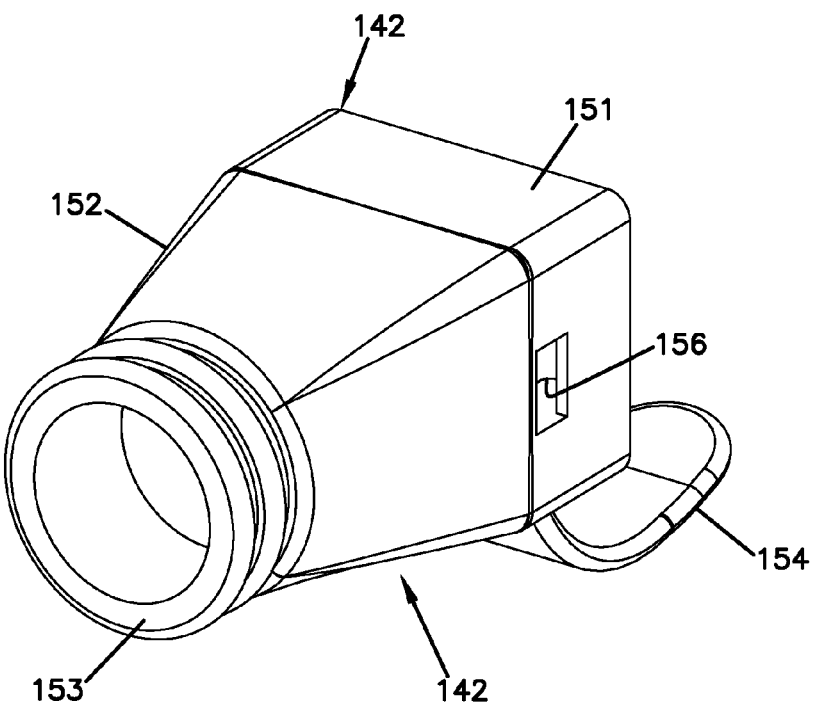
FIG. 6 is a rear, bottom perspective view of the boot member of FIG. 5.
Figure 7:
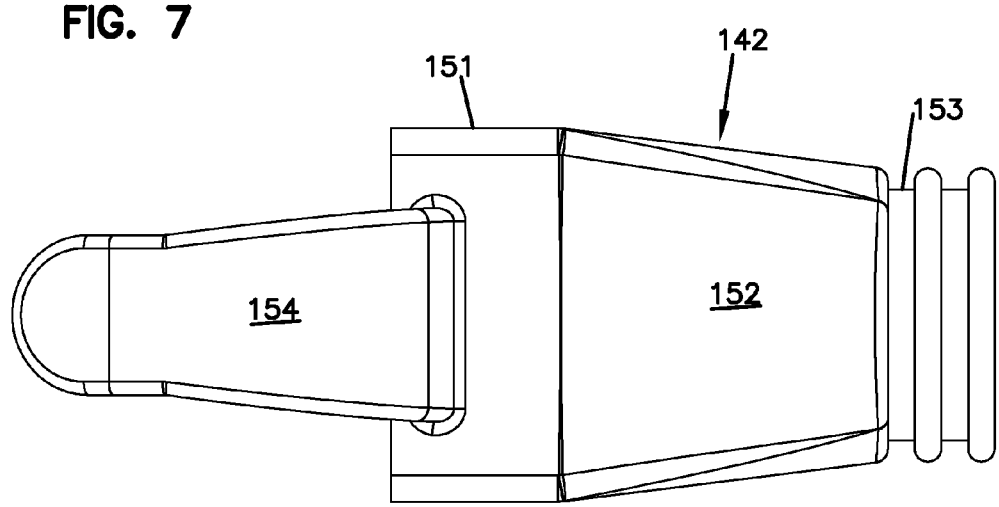
FIG. 7 is a bottom plan view of the boot member of FIG. 5.
Figure 8:
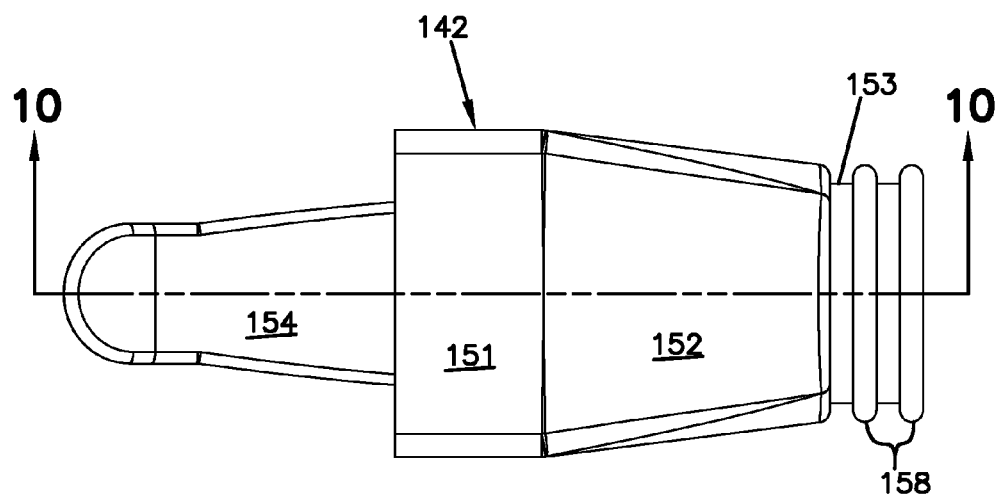
FIG. 8 is a top plan view of the boot member of FIG. 5.
Figure 9:
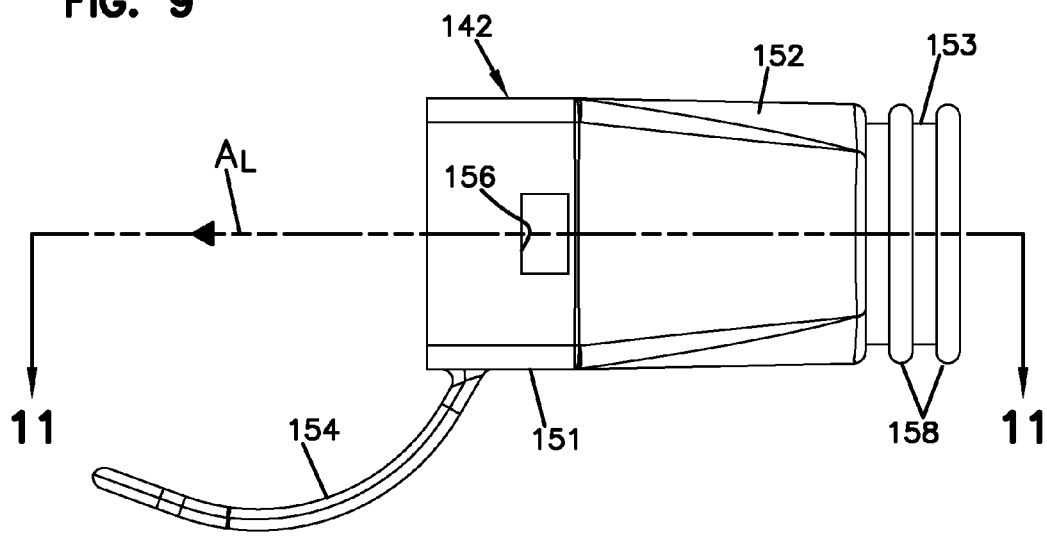
FIG. 9 is a side elevational view of the boot member of FIG. 5.
Figure 10:
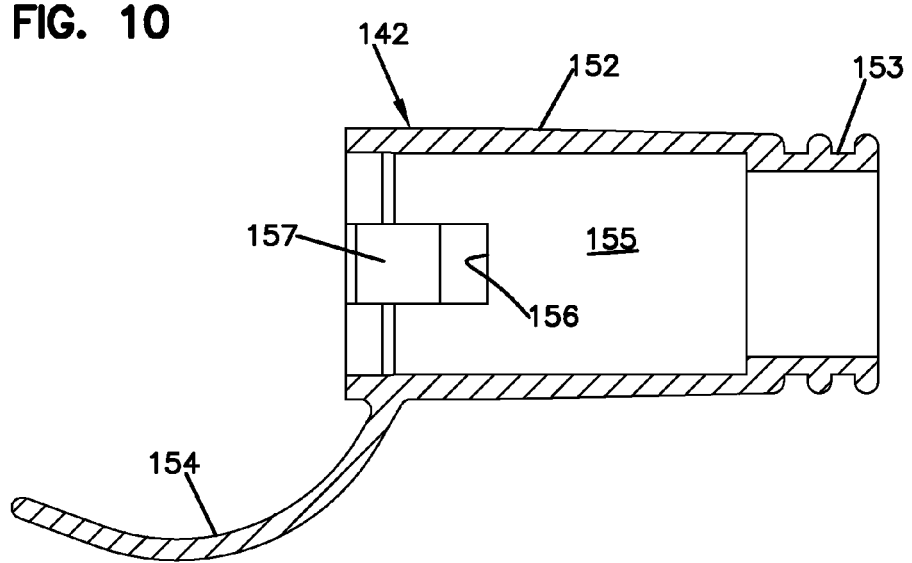
FIG. 10 is a cross-sectional view taken along the 10-10 line of FIG. 8.
Figure 11:
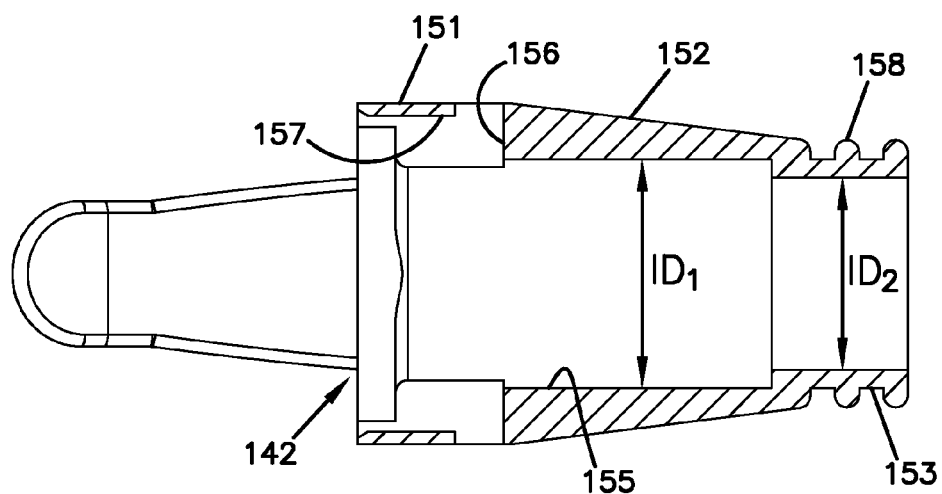
FIG. 11 is a cross-sectional view taken along the 11-11 line of FIG. 9.
Figure 12:
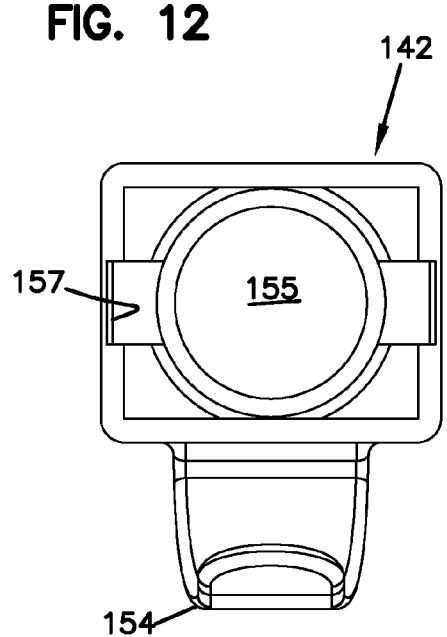
FIG. 12 is a front elevational view of the boot member of FIG. 5.
Figure 13:
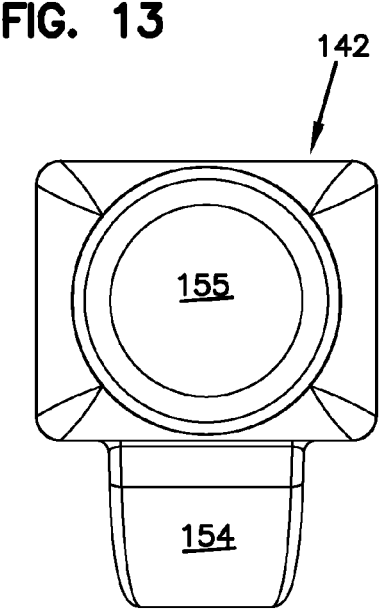
FIG. 13 is a rear elevational view of the boot member of FIG. 5.
Figure 14:
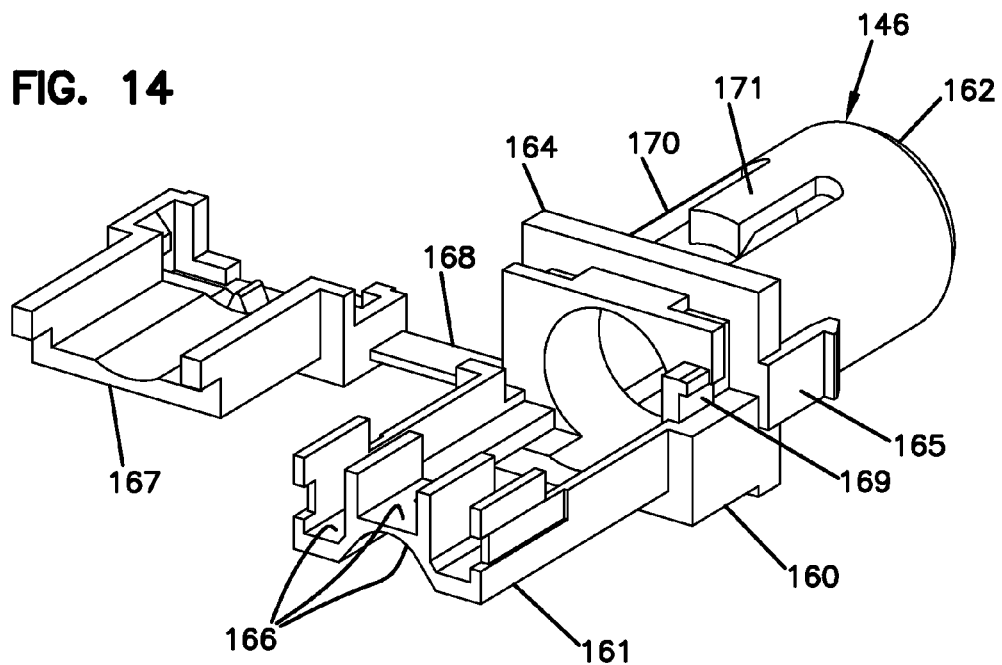
FIG. 14 is a front, bottom perspective view of a wire manager of one of the connectors of FIG. 1, shown in isolation.
Figure 15:
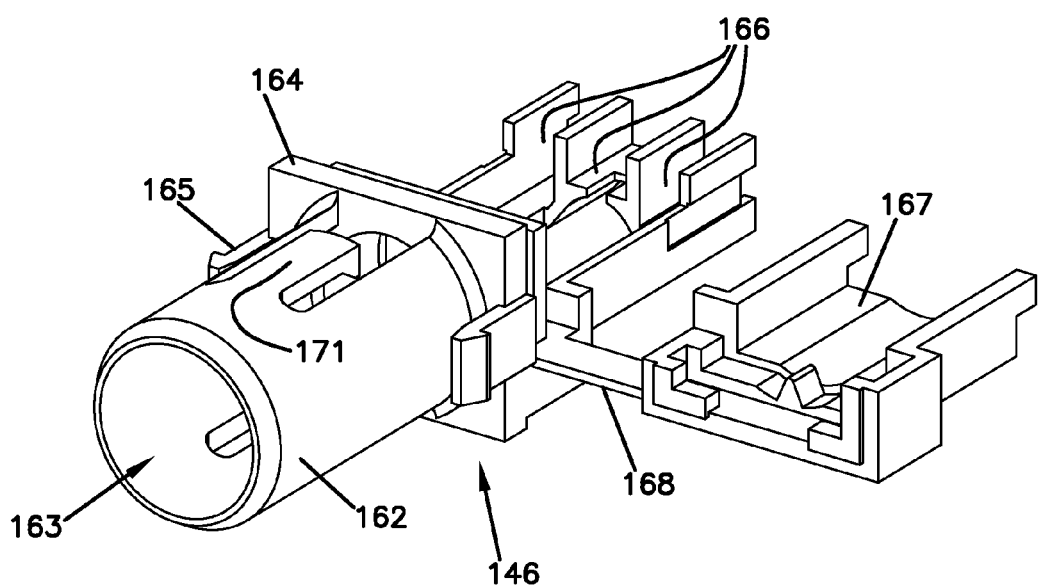
FIG. 15 is a rear, bottom perspective view of the wire manager of FIG. 14.
Figure 16:
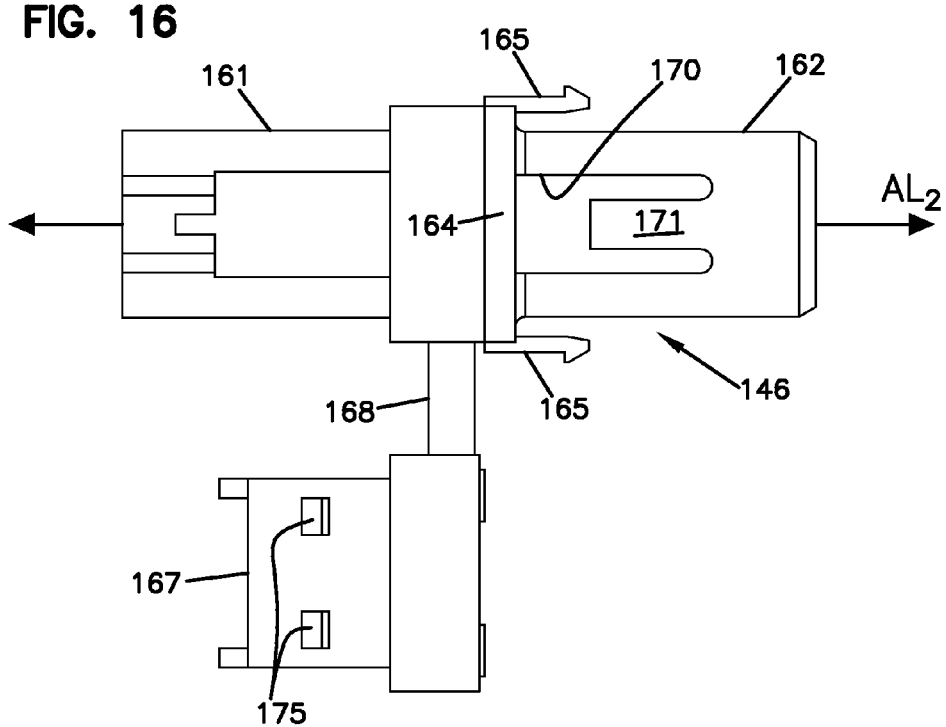
FIG. 16 is a top plan view of the wire manager of FIG. 14.
Figure 17:
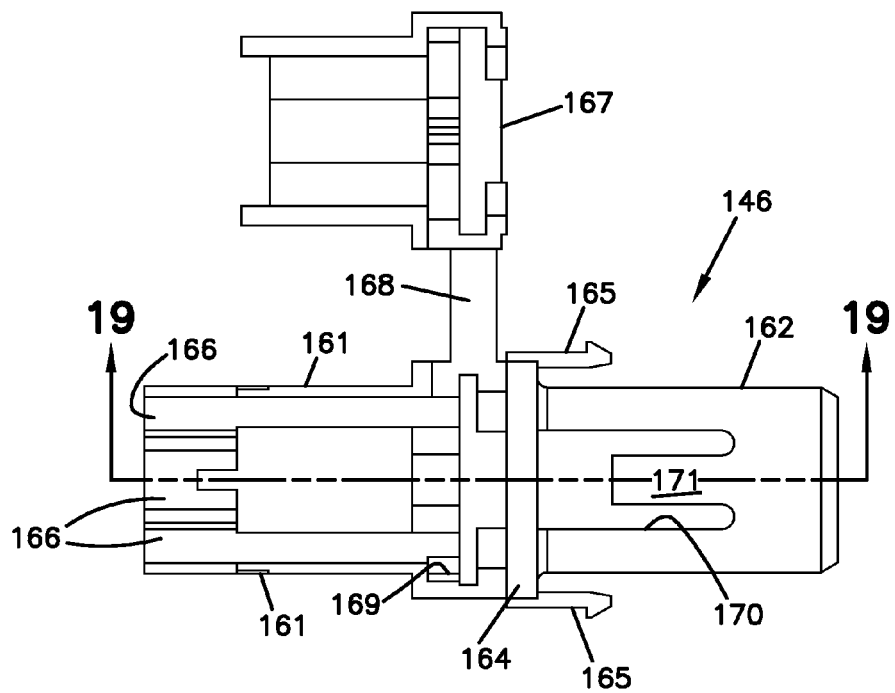
FIG. 17 is a bottom plan view of the wire manager of FIG. 14.
Figure 18:
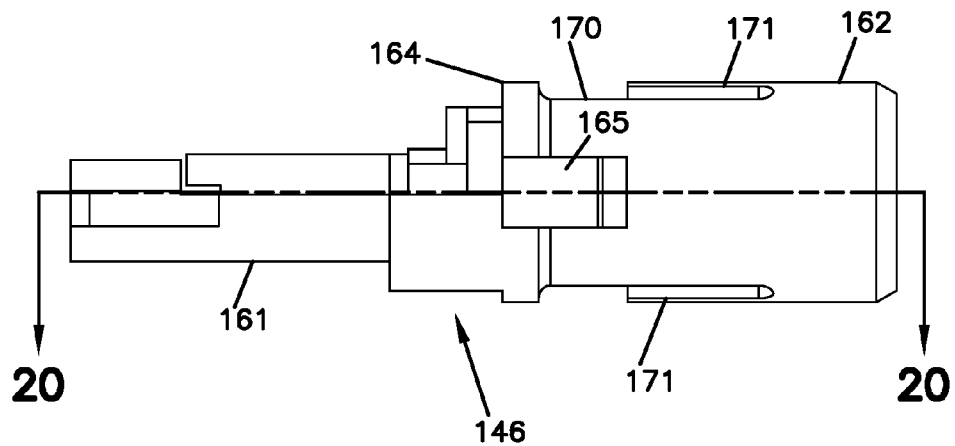
FIG. 18 is a side elevational view of the wire manager of FIG. 14.

Referring to FIGS. 3 and 4, the cable 102 of the presently disclosed patch cord 100 includes a plurality of twisted pairs 108. In the illustrated example, the cable 102 includes four twisted pairs 108. Each of the four twisted pairs includes first and second insulated conductors 105 twisted about one another along a longitudinal pair axis. The electrical conductors (e.g., wires) of the insulated conductors 105 may be made of copper, aluminum, copper-clad steel, plated copper, or other electrically conductive materials. In one example implementation, the conductors 105 are made of braided/stranded copper. One example of a braided/stranded copper conductor construction that can be used is described in more detail in U.S. Pat. No. 6,323,427, which is incorporated herein by reference. In other implementations, the conductors 105 may be made of glass or plastic fiber such that a fiber optic cable is produced in accordance with the principles disclosed. The insulating layer of the insulated conductors 105 can be made of electrical insulating materials (e.g., fluoropolymers).

The plurality of twisted pairs 108 of the cable 102 defines a cable core 104. In the illustrated example of FIG. 3, the core 104 includes only the plurality of twisted pairs 108. In alternative implementations, the core 104 also may include a spacer that separates or divides the twisted pairs 108. For example, a star-type spacer can be used to divide the four twisted pairs 108. Other spacers, such as flexible tape strips or fillers defining pockets and having retaining elements that retain each of the twisted pairs within the pockets, also can be used. Additional spacer examples suitable for use with the cable 102 are described in U.S. Pat. Nos. 7,214,884; 7,115,815; and 7,271,342, the disclosures of which are hereby incorporated herein by reference.

Referring still to FIGS. 3 and 4, the cable 102 includes a jacket 106 that surrounds the core 104 of twisted pairs 108. In the illustrated embodiment, the jacket 106 is a double jacket having both a first inner jacket 107 and a second outer jacket 109. The inner jacket 107 surrounds the core 104 of twisted pairs 108. The outer jacket 109 surrounds the inner jacket 107. The inner and outer jackets 107, 109 function not only to maintain the relative positioning of the twisted pairs 108, but also to lessen the occurrence of alien crosstalk.

In some implementations, the outer jacket 109 has an outer diameter OD1 of between about 0.3 inches (about 7.6 mm) and about 0.315 inches (about 8 mm). In certain implementations, the outer diameter OD1 is about 0.303 inches (about 7.7 mm). In certain implementations, the outer diameter OD1 is about 0.307 inches (about 7.8 mm). In certain implementations, the outer diameter OD1 is about 0.311 inches (about 7.9 mm). In some implementations, the inner jacket 107 has an outer diameter OD2 of between about 0.23 (about 5.8 mm) inches and about 0.26 inches (about 6.6 mm). In certain implementations, the outer diameter OD2 is about 0.252 inches (about 6.4 mm). In certain implementations, the outer diameter OD2 is about 0.244 inches (about 6.2 mm).

The inner jacket 107 and the outer jacket 109 of the example cable 102 can be made from similar materials, or can be made of materials different from one another. Some example materials that can be used to manufacture the inner and outer jackets 107, 109 include plastic materials, such as polyvinyl chloride (PVC), polyethylene, fluoropolymers (e.g. ethylenechlorotrifluorothylene (ECTF) and Flurothylenepropylene (FEP)), or other electrically insulating materials. In other implementations, a low-smoke, zero-halogen material (e.g., polyolefin) can be used.

In one embodiment, each of the twisted pairs 108 of the cable 102 has a twist rate and associated lay length different from that of the other twisted pairs. This type of arrangement aids in reducing crosstalk between the pairs of the cable core 104. The cable core 104 of the cable 102 also has a cable twist rate and associated cable lay length. Various twisted pairs lay length arrangements and cable core lay lengths can be utilized in accordance with the present disclosure. Some example arrangements are described in U.S. Pat. No. 7,375,284, the disclosure of which is hereby incorporated herein by reference. Additional cable arrangements having other example pair and cable lay length arrangements that can be used are described in U.S. Pat. Nos. 7,214,884; 7,115,815; 7,271,342; 7,173,189; and 7,411,131; the disclosures of which are hereby incorporated herein by reference.

C. Connector with Retention Arrangement

Referring back to FIGS. 1 and 2, the first and second connectors 140 of the present patch cord 100 are each attached to the ends 101, 103 of the cable 102. In the illustrated example, the connectors 140 are plug-type connectors. In other implementations, however, the connectors 140 can include jack-type connectors. Each of the connectors 140 generally includes a boot member 142, a plug nose 144, and a wire manager 146. In one implementation, each of the components (e.g. 142, 144, 146) of the connector 140 is manufactured from polycarbonate. In other implementations, other materials also can be used in manufacturing the connector 140.

As shown in FIG. 1, each plug nose 144 includes main signal contacts 112 that terminate conductors 105 of the cable 100. Certain types of plug noses 144 also include memory storage contacts 114 that connect to a storage device carried by the plug nose 144. For example, the storage contacts 114 and memory device may be disposed in a key area 116 of each plug nose 144. Example implementations of a suitable plug nose 144 for use with connectors 140 are disclosed in U.S. patent application Ser. No. 12/907,724, filed Oct. 19, 2010, and titled "Managed Electrical Connectivity Systems," the disclosure of which is hereby incorporated herein by reference.

The boot member 142 and wire manager 146 cooperate to aid in retaining the connector 140 on the cable 102. FIGS. 5-13 illustrate one example implementation of a suitable boot member 142 for use with a connector 140. FIGS. 14-22 illustrate one example implementation of a suitable wire manger 146 for use with a connector 140. The interaction between the boot member 142 and the wire manager 146 will be discussed herein with reference to FIGS. 23-33.

The boot member 142 has a body 150 having a tapered section 152 extending between an attachment section 151 and a collar section 153. At least one side of the tapered section 152 slopes radially inwardly from the attachment section 151 to the collar section 153. In the example shown, two of the sides slope radially inwardly (see FIG. 7) and two of the sides extending generally parallel with the attachment section (see FIG. 9). A bore 155 extends through the boot member body 150 along a longitudinal axis $A_L$ from a first open end defined at the attachment section 151 to a second open end defined at the collar section 153.

In some implementations, an arm 154 extends from the body 150 forwardly of the attachment section 151. For example, the arm 154 may extend from one side of the attachment section 151. In certain implementations, the arm 154 is curved in an arc extending first away from and then towards a longitudinal axis $A_L$ of the body 150. The arm 154 is sufficiently resilient to cooperate with a latching arm of the plug nose 144 to selectively release the connector 140 from an adapter port. Details pertaining to the interaction between the arm 154 and the plug nose latching arm can be found in U.S. patent application Ser. No. 12/907,724, incorporated by reference above.

The attachment section 151 defines one or more latching openings 156 configured to receive latching arms 165 of the wire manager body 160, which is described in more detail herein. In the example shown, the boot member body 150 defines a first latching opening 156 at a first side of the attachment section 151 and a second latching opening 156 at a second, opposite side of the attachment section 151. In other implementations, however, greater or fewer latching openings 156 may be provided at the same or different locations on the attachment section 151.

In some implementations, an inner surface of the attachment section 151 defines recessed channels 157 that extend between the first open end of the connector body 150 and the latching openings 156. The recessed channels 157 may guide the latching arms 165 of the wire manger 160 to the latching openings 156. In some implementations, the recessed channels 157 are flat. In other implementations, the recessed channels 157 are ramped.

In the example shown, an exterior surface of the collar section 153 includes ridges 158. The ridges 158 may provide increased strength to the collar section 153 while still allowing some flex of the collar section 158. In some implementations, an inner surface of the collar section 153 has a smaller internal diameter ID2 than the internal diameter ID1 of the tapered section 152 (see FIG. 11). In certain implementations, the inner surface of the collar section 153 steps radially inwardly from the inner surface of the tapered section 152.

In some implementations, the internal diameter ID 1 of the tapered section 152 is sufficient large to accommodates an outer diameter of the wire manager 146. For example, in certain implementations, the internal diameter ID1 of the tapered section 152 is about 0.355 inches (about 9 mm) to about 0.385 inches (about 9.8 mm). In one example implementation, the internal diameter ID1 of the tapered section 152 is about 0.37 inches (about 9.4 mm).

In some implementations, the inner surface of the collar section 153 has an internal diameter ID2 of between about 0.24 inches (about 6.1 mm) and about 0.315 inches (about 8 mm). For example, in certain implementations, the internal diameter ID2 of the collar section 153 is about 6.6 mm (about 0.26 inches). In certain implementations, the internal diameter ID2 of the collar section 153 is about 7.8 mm (about 0.307 inches). In certain implementations, the internal diameter ID2 of the collar section 153 is about 0.276 inches (about 7.0 mm). In certain implementations, the internal diameter ID2 of the collar section 153 is about 0.291 inches (about 7.4 mm). In certain implementations, the internal diameter ID2 of the collar section 153 is about 0.3 inches (about 7.62 mm).

The wire manager 146 has a body 160 including a management section 161 and a retention section 162 extending from opposite sides of an attachment section 164. Latching arms 165 are provided on an exterior of the attachment section 164. A bore 163 extends through at least the retention section 162 along a longitudinal axis $A_{L2}$. In certain implementations, the bore 163 extends through the retention section 162 and the attachment section 164.

The inner surface of the retention section 162 has an internal diameter ID3 that is sufficiently large to receive the cable 102 including both the inner jacket 107 and the outer jacket 109. The inner surface steps radially inwardly at the attachment section 164. Accordingly, the inner surface of the attachment section 164 has an inner diameter ID4 that is smaller than the inner diameter ID3 (see FIG. 20). The inner diameter ID4 of the attachment section 164 is sufficiently large to receive the inner jacket 107 of the cable 102 (and components received therein), but not the outer jacket 109 (see FIG. 28).

In some implementations, the internal diameter ID3 of the retention section 162 is about the same as the internal diameter ID2 of the collar section 153 of the boot member body 150. In certain implementations, the internal diameter ID3 ranges between about 0.24 inches (about 6.1 mm) and about 0.315 inches (about 8 mm). For example, in certain implementations, the internal diameter ID3 of the retention section 162 is about 6.6 mm (about 0.26 inches). In certain implementations, the internal diameter ID3 of the retention section 162 is about 7.8 mm (about 0.307 inches). In certain implementations, the internal diameter ID3 of the retention section 162 is about 0.276 inches (about 7.0 mm). In certain implementations, the internal diameter ID3 of the retention section 162 is about 0.291 inches (about 7.4 mm). In certain implementations, the internal diameter ID3 of the retention section 162 is about 0.3 inches (about 7.62 mm).

In some implementations, the inner diameter ID4 of the attachment section 164 is between about 0.209 inches (5.3 mm) and 0.26 inches (about 6.6 mm). In certain implementations, the inner diameter ID4 of the attachment section 164 is about 0.216 inches (about 5.5 mm). In certain implementations, the inner diameter ID4 of the attachment section 164 is about 0.252 inches (about 6.4 mm). In certain implementations, the inner diameter ID4 of the attachment section 164 is about 0.228 inches (about 5.8 mm). In certain implementations, the inner diameter ID4 of the attachment section 164 is about 0.236 inches (about 6 mm). In certain implementations, the inner diameter ID4 of the attachment section 164 is about 0.244 inches (about 6.2 mm). In certain implementations, the inner diameter ID4 of the attachment section 164 is about 0.25 inches (about 6.35 mm).

The management section 161 of the wire manager body 160 defines a plurality of channels 166 configured to receive components of the cable 102. For example, in some implementations, each channel 166 is configured to receive a twisted pair 108 of the cable 102. In other implementations, the management section 161 defines a sufficient number of channels 166 so that each channel 166 receives one wire of a twisted pair. In some implementations, the channels 166 extend coaxially. In other implementations, the channels 166 may branch out and extend at angles from each other. In the example shown, at least one channel 166 is formed beneath another channel 166. In other implementations, the management section 161 may have any suitable channel configuration.

In some implementations, the management section 161 also includes a moveable cover 167. In FIGS. 14-22, the cover 167 is shown in an open position, thereby providing access to the channels 166. The cover 167 is configured to move to a closed position (see FIG. 29) covering the open channels 166. In the example shown, the cover 167 is attached to a base of the management section 161 via a flexible arm 168 that is configured to bend about a living hinge. The cover 167 latches to the base of the management section 161 when the cover 167 is moved to the closed position. For example, in FIG. 21, the base of the management section has a latching arm 169 and the cover 167 defines a recess at which the latching arm 169 retains the cover 167.

In some implementations, at least one of the base and the cover 167 include grips that aid in retaining the portion of the cable 102 held between the cover 167 and the base. In certain implementations, both the base and the cover 167 include grips. In the example shown, the cover includes a single gripping tooth. In other implementations, however, the base and/or the cover 167 may include more grips.

In some implementations, the retention section 162 of the wire manager body 160 has a generally cylindrical shape. In other implementations, however, the retention section 162 may have a rectangular cross-sectional shape, obround cross-sectional shape, oval cross-sectional shape, or any other suitable cross-sectional shape. The retention section 162 defines at least one slot 170 in a circumferential wall of the retention section 162 leading to the axial bore 163. In the example shown, the retention section 162 defines two slots 170 positioned at opposite sides of the circumferential wall. In other implementations, three or more such slots 170 may be defined.

Figure 19:
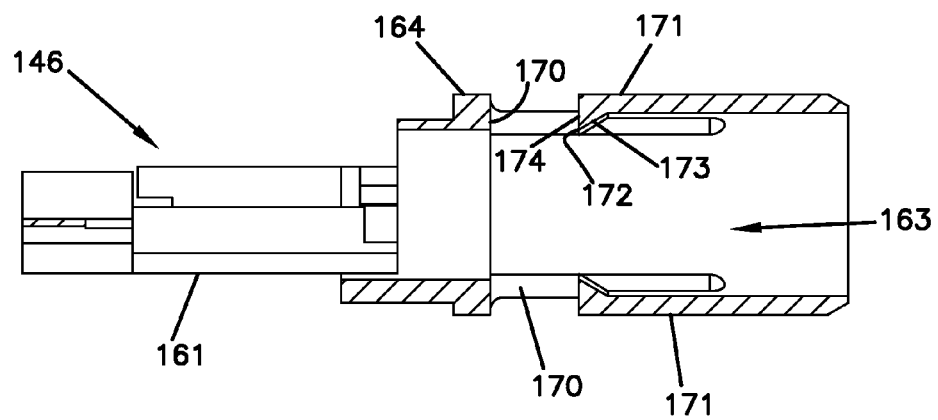
FIG. 19 is a cross-sectional view taken along the 19-19 line of FIG. 17.
Figure 20:
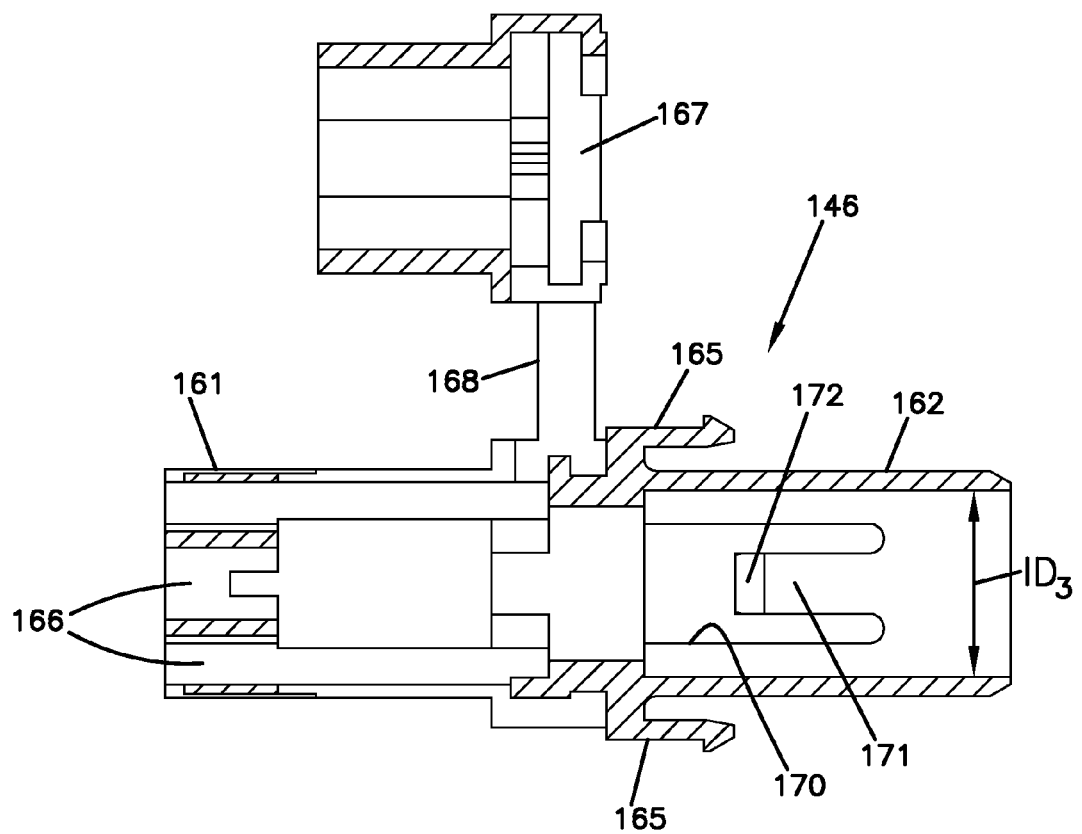
FIG. 20 is a cross-sectional view taken along the 20-20 line of FIG. 18.
Figure 21:
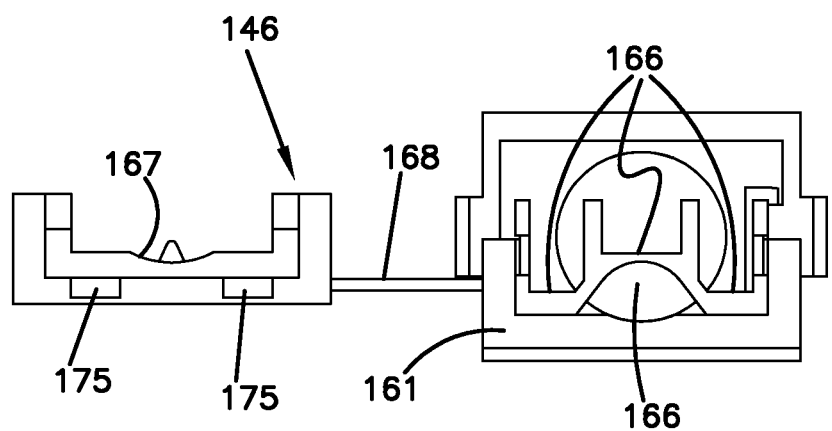
FIG. 21 is a front elevational view of the wire manager of FIG. 14.
Figure 22:
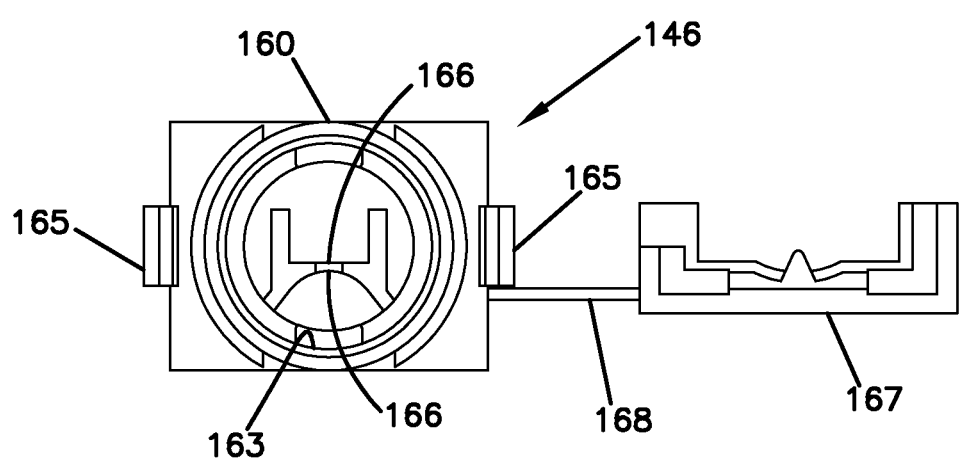
FIG. 22 is a rear elevational view of the wire manager of FIG. 14.

A flexible tab 171 extends into each slot 170. Each tab 171 is configured to flex through the respective slot 170 and into the bore 163 of the retention section 162. In some implementations, each tab 171 defines an outer boundary of the retention section 162 when the tab 171 is in an unflexed position. In other implementations, the tabs 171 may be positioned radially outwardly from the outer boundaries of the retention section 162 when in the unflexed positions. Each tab 171 has a tooth 172 that protrudes inwardly towards the bore 163. Each tooth 172 defines a ramp 173 camming inwardly as the ramp 173 extends towards the management section 161 (FIG. 19). Each tooth 172 also defines a shoulder 174 that faces the management section 161.

FIGS. 23-33 show the boot member 142 and the wire manager 146 being positioned on each end of the cable 102. As will be described in greater detail hereinafter, assembly of the boot member 142 and wire manager 146 provides axial retention and strain relief for the connector 140. For ease in understanding the movement of the various components over the cable 102, the depiction of cable 102 in FIGS. 24-30 is prematurely cut off within the body 150 of the boot member 142. It should be understood that the components of cable 102 continue to extend through the boot member housing 150 and along the length of the cable 102 (e.g., see FIGS. 1, 2, and 23).

Figure 23:
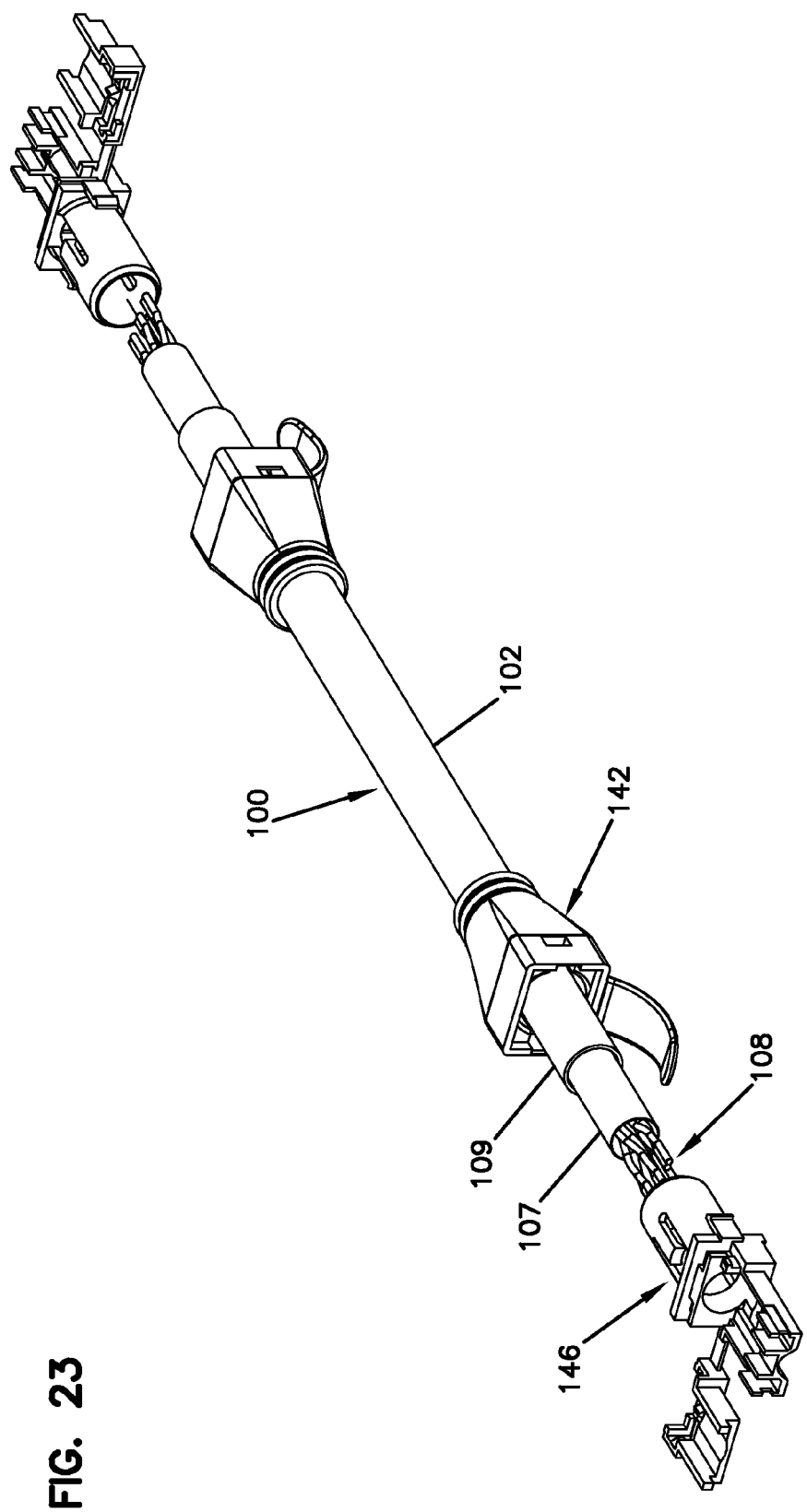
FIG. 23 is an exploded, perspective view of the patch cord of FIG. 1, with the plug nose removed from each connector.
Figure 24:
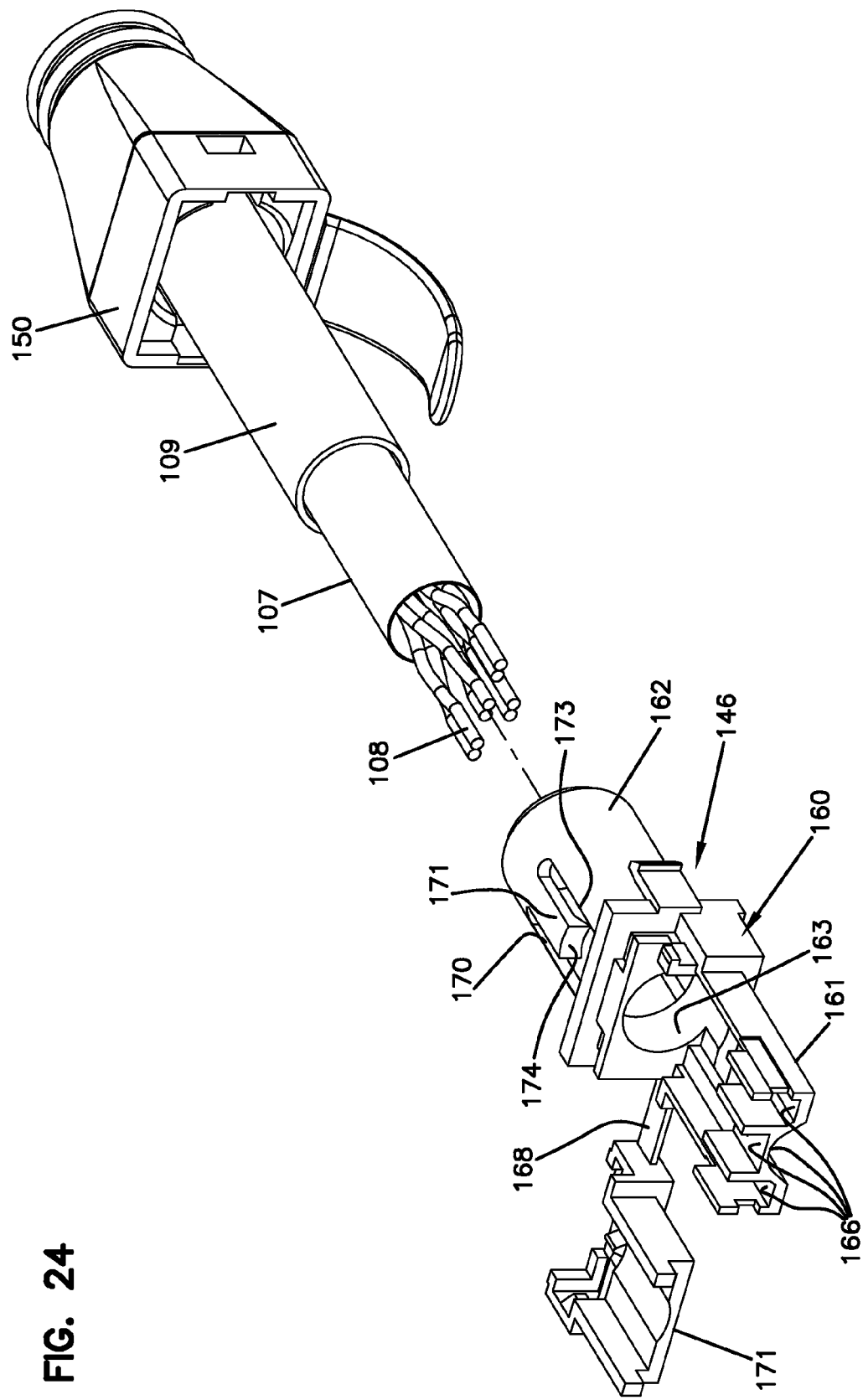
FIG. 24 is an enlarged view of the wire manager, boot member, and a portion of the multi-pair cable of FIG. 23.

As shown in FIG. 23, each end of the cable 102 includes a section along which the outer jacket 109 has been removed. The inner jacket 107 has been removed from an end portion of this section to reveal the twisted pairs 108. To assemble the connector 140 on one of the ends, the cable 102 is inserted through the bore 155 defined in the boot member body 150 until the boot member body 150 is slid over the outer jacket 109 of the cable 102. As shown in FIG. 24, the twisted pairs 108 are aligned with the bore 163 defined through the retention section 162 of the wire manager body 160.

Figure 25:
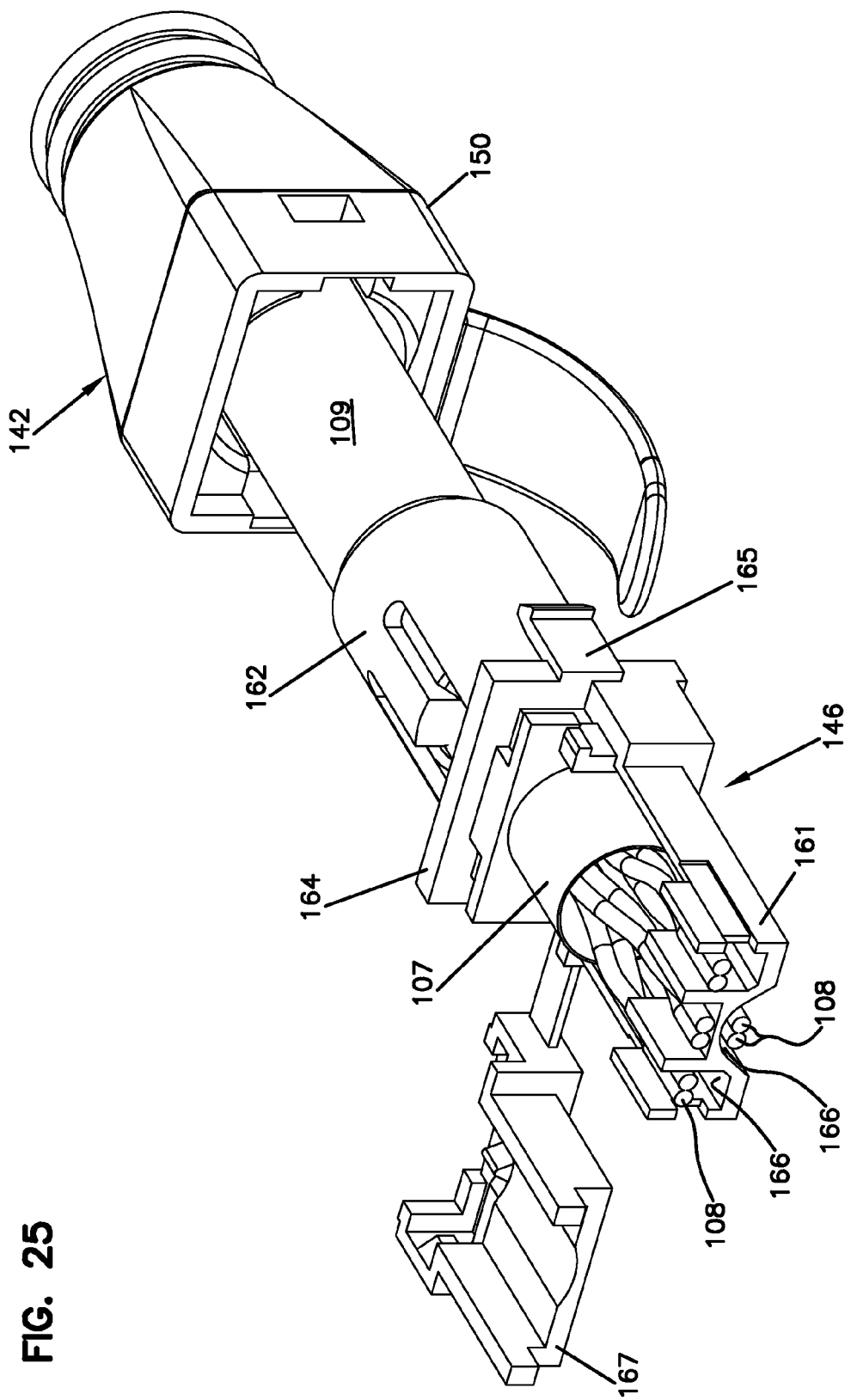
FIG. 25 is a perspective view of a partially assembled connector with the multi-pair cable of FIG. 3 slid through the boot member of FIGS. 5-13 and slid partially through the wire manager of FIGS. 14-22.
Figure 26:
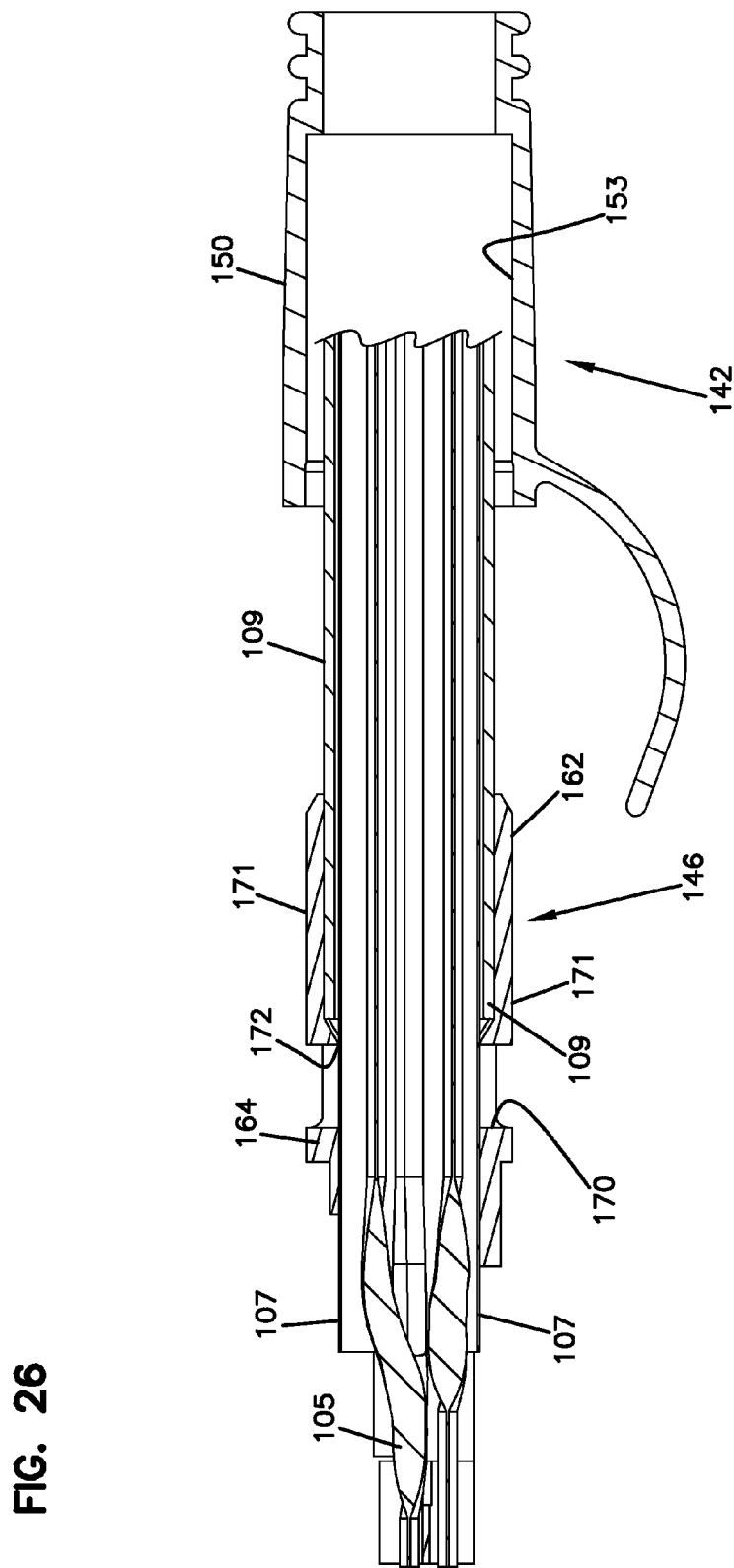
FIG. 26 is a cross-sectional view taken along the longitudinal axis of the partially assembled connector of FIG. 25.

The wire manger body 160 is slid over the cable 102 so that the twisted pairs 108 pass through the bore 163 towards the channels 166 of the management section 161 (see FIG. 25). In the example shown, each twisted pair 108 is positioned in a separate channel 166. A portion of the inner jacket 107 of the cable 102 extends through the bore 163 and into the management section 161. As shown in FIG. 26, the outer jacket 109 enters the bore 163 of the retention section 162 and initially abuts the teeth 172 of the flexible tabs 171.

Figure 27:
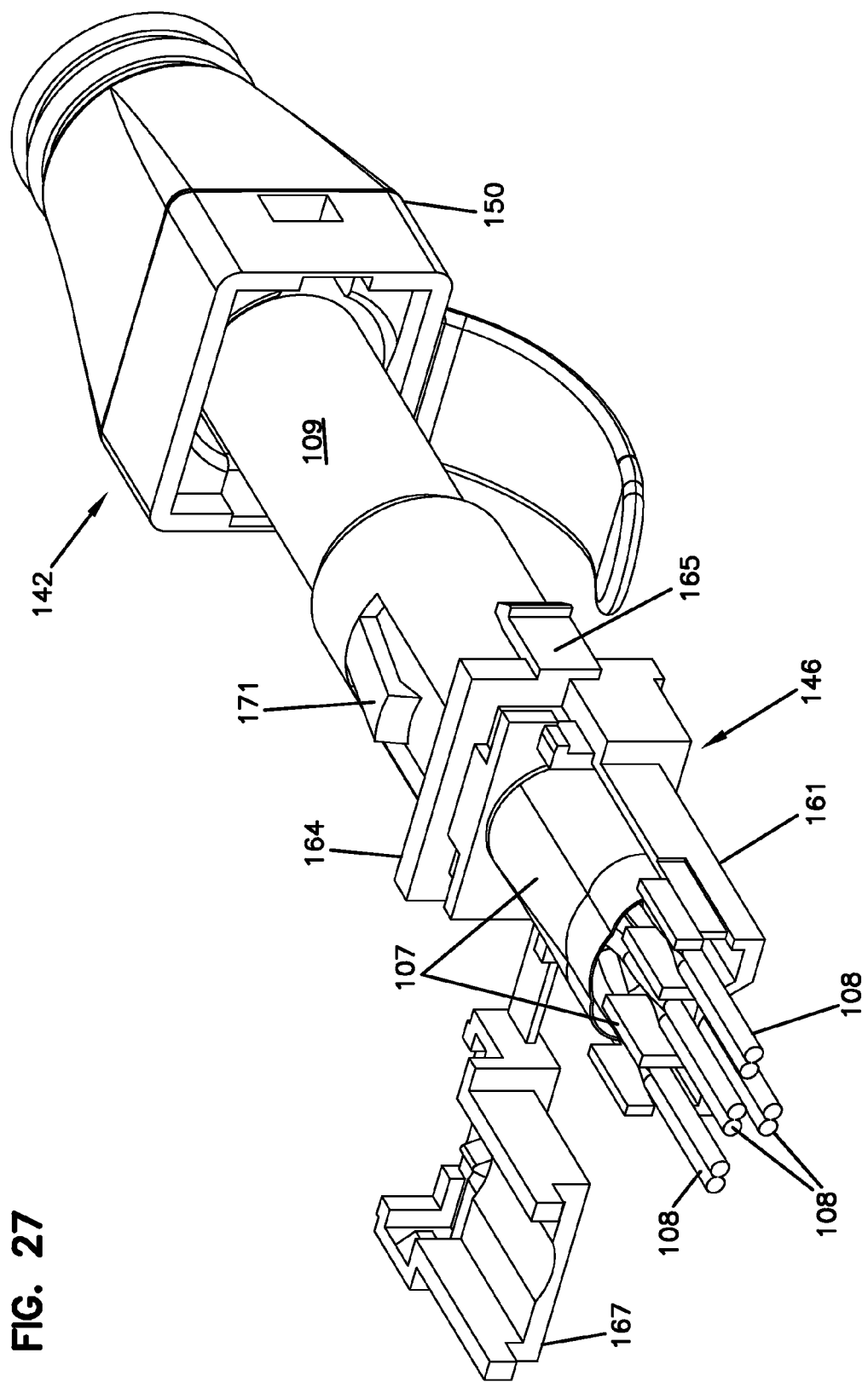
FIG. 27 is a perspective view of the partially assembled connector of FIG. 25 with the multi-pair cable slid further through the wire manager.
Figure 28:
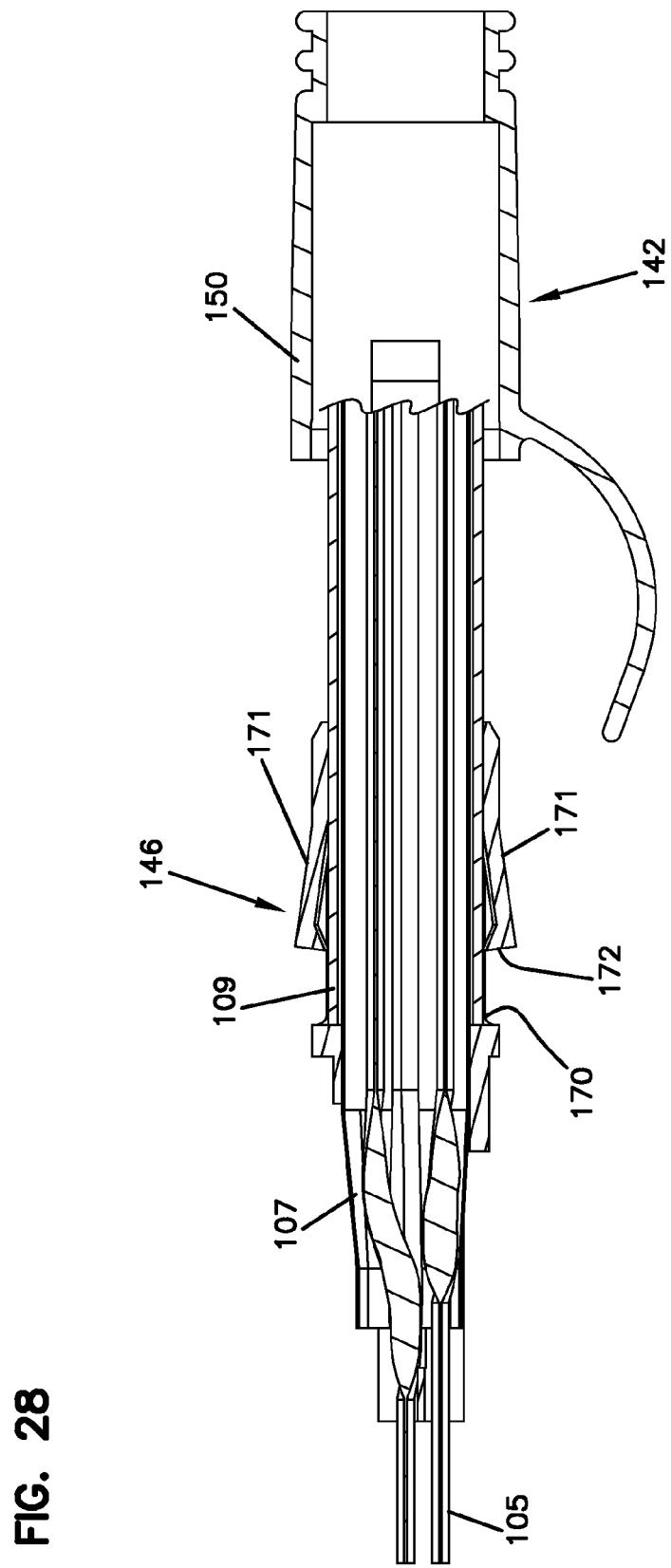
FIG. 28 is a cross-sectional view taken along the longitudinal axis of the partially assembled connector of FIG. 27.

As shown in FIGS. 27 and 28, the wire manager body 160 is further slid over the cable 102 until an end of the inner jacket 107 is located a load bar defining the channels 166 and an end of the outer jacket 109 abuts a shoulder of the attachment section 164 of the wire manager body 160. The outer diameter OD1 of the outer jacket 109 is greater than the inner diameter ID4 of the attachment section 164. Accordingly, the outer jacket 109 does not pass through the bore 163 defined in the attachment section 164. The outer diameter OD2 of the inner jacket 107, however, is sufficiently small to pass through the inner bore 163 of the attachment section 164.

As shown in FIG. 28, sliding the outer jacket 109 past the flexible tabs 171 biases the flexible tabs 171 outwardly from the slots 170. The teeth 172 of the tabs 171 ride over the surface of the outer jacket 109. In some implementations, the outer jacket 109 biases the tabs 171 sufficiently outward so that the tips of the teeth 172 align with the inner surface of the circumferential wall of the retention section 162. In other implementations, however, the teeth 172 are biased out of the slots 170 of the retention section 162. In still other implementations, the tabs 171 are not flexed sufficient to remove the teeth 172 from the bore 163.

Figure 29:
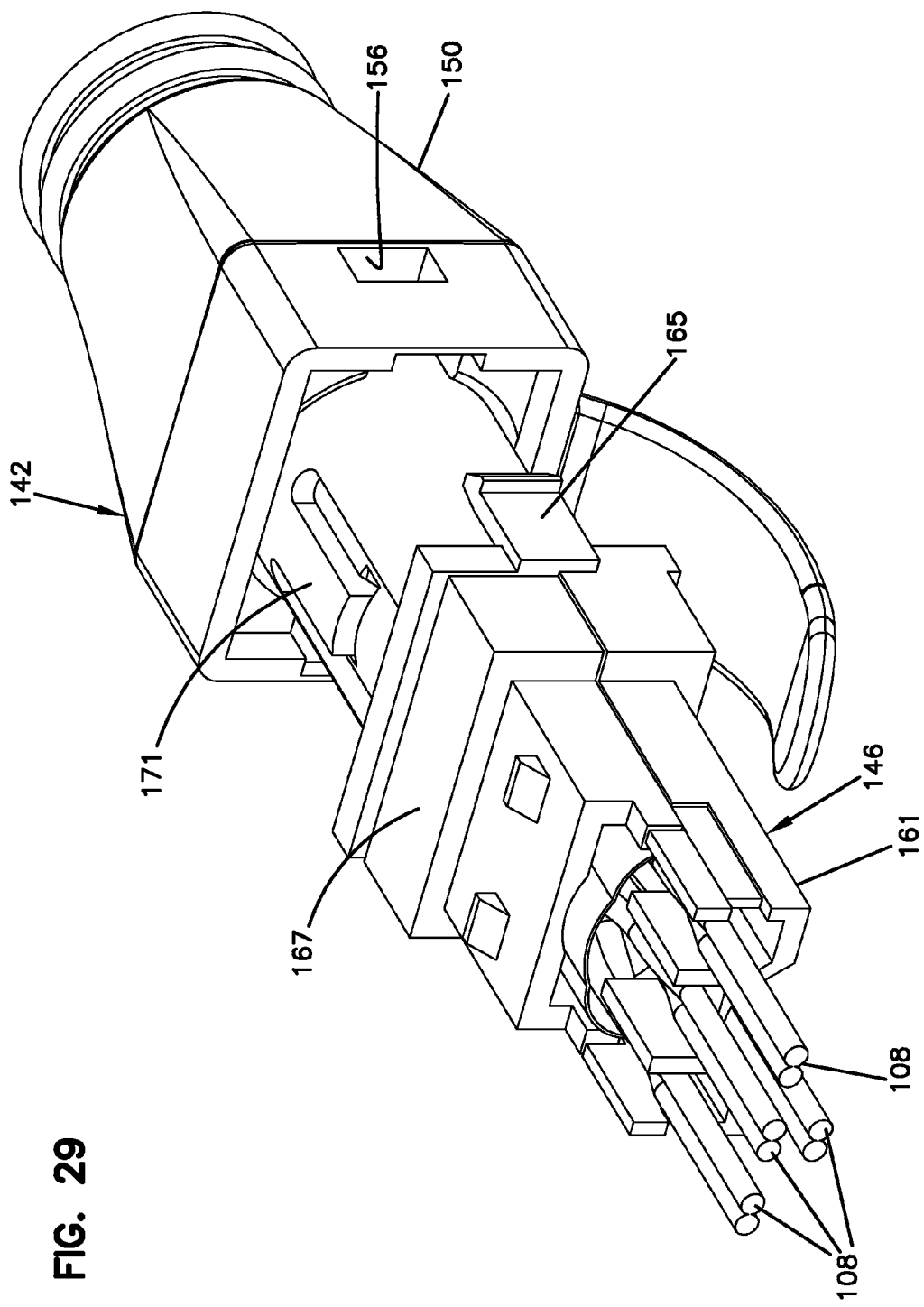
FIG. 29 is a perspective view of the partially assembled connector of FIG. 25 with the boot member advanced partially over the wire manager.
Figure 30:
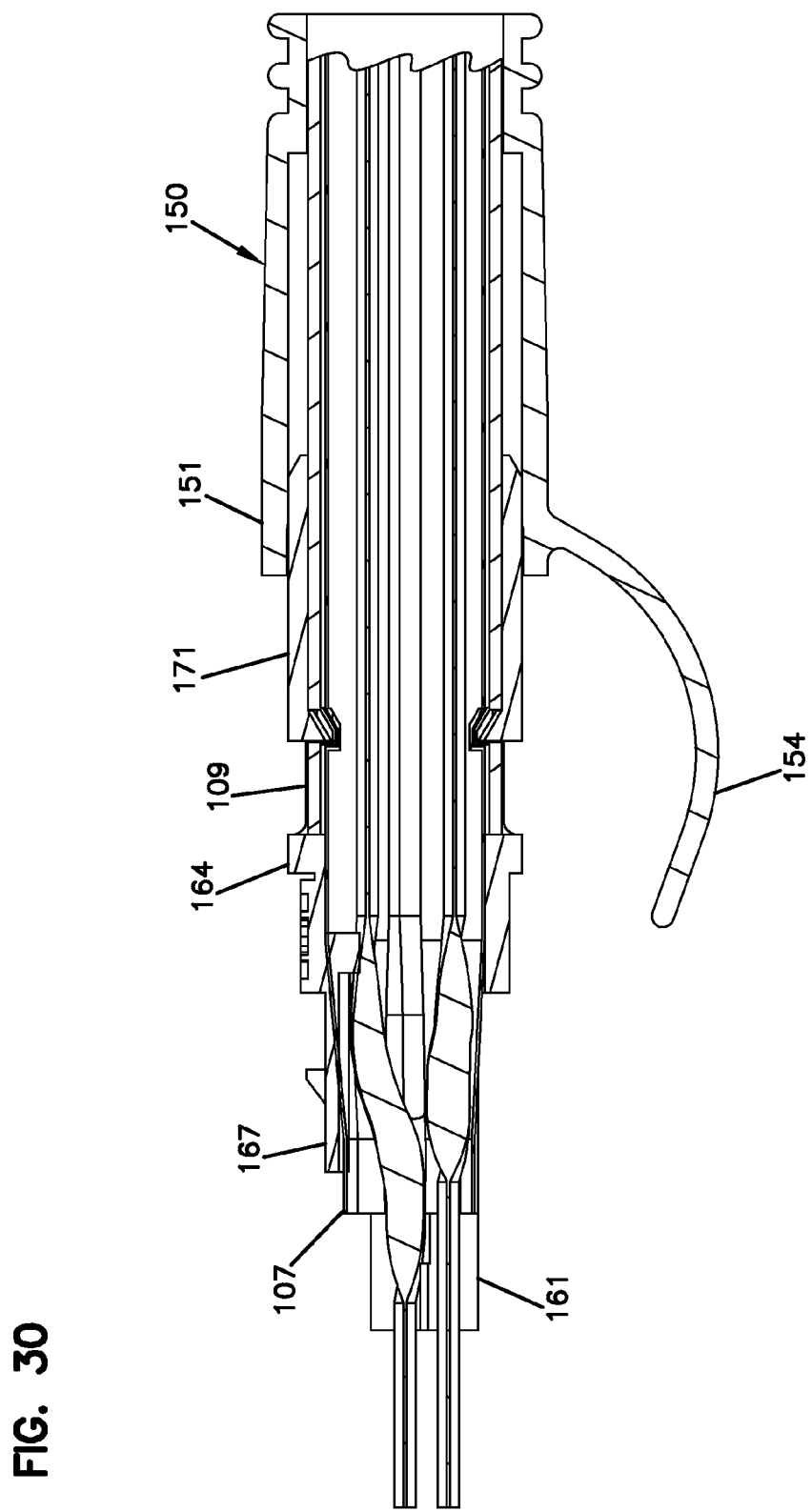
FIG. 30 is a cross-sectional view taken along the longitudinal axis of the partially assembled connector of FIG. 29.

As shown in FIGS. 29 and 30, the cover 167 closes over the inner jacket 107 to enclose the inner jacket 107 at the management section 161. In some implementations, the cover 167 presses tightly enough against the inner jacket 107 and twisted pairs 108 to inhibit movement of the twisted pairs 108 from their respective channels 166. In other implementations, the cover 167 presses tightly enough against the inner jacket 107 to inhibit axial movement of the wire manager body 160 relative to the inner jacket 107. In some implementations, the gripping tooth of the cover 167 bites into the inner jacket 107. In other implementations, the gripping tooth presses against, but does not penetrate, the inner jacket 107. In certain implementations, the cover 167 latches shut.

The boot member body 150 is moved axially along the cable 102 towards the wire manager body 160 so that the attachment section 151 of the boot member body 150 begins to slide over the retention section 162 of the wire manager body 160. As the retention section 162 is received in the bore 155 of the boot member body 150, the inner surfaces of the boot member body 150 press against the flexible tabs 171 of the retention section 162. The pressure exerted on the flexible tabs 171 by the boot member body 150 deflects the tabs 171 inwardly through the slots 170 of the retention member 162.

As the tabs 171 flex through the slots 170, the teeth 172 of the tabs 171 bite into at least the outer jacket 109 of the cable 102. In some implementations, the teeth 172 extend fully through the outer jacket 109 of the cable 102. In other implementations, the teeth 172 extend only partially through the outer jacket 109 of the cable 102. In some implementations, the teeth 172 extend at least partially into the inner jacket 107 of the cable 102 (see FIG. 30). In certain implementations, the teeth 172 extend fully through the inner jacket 107. In other implementations, the teeth 172 do not bite into the inner jacket 107.

Figure 31:
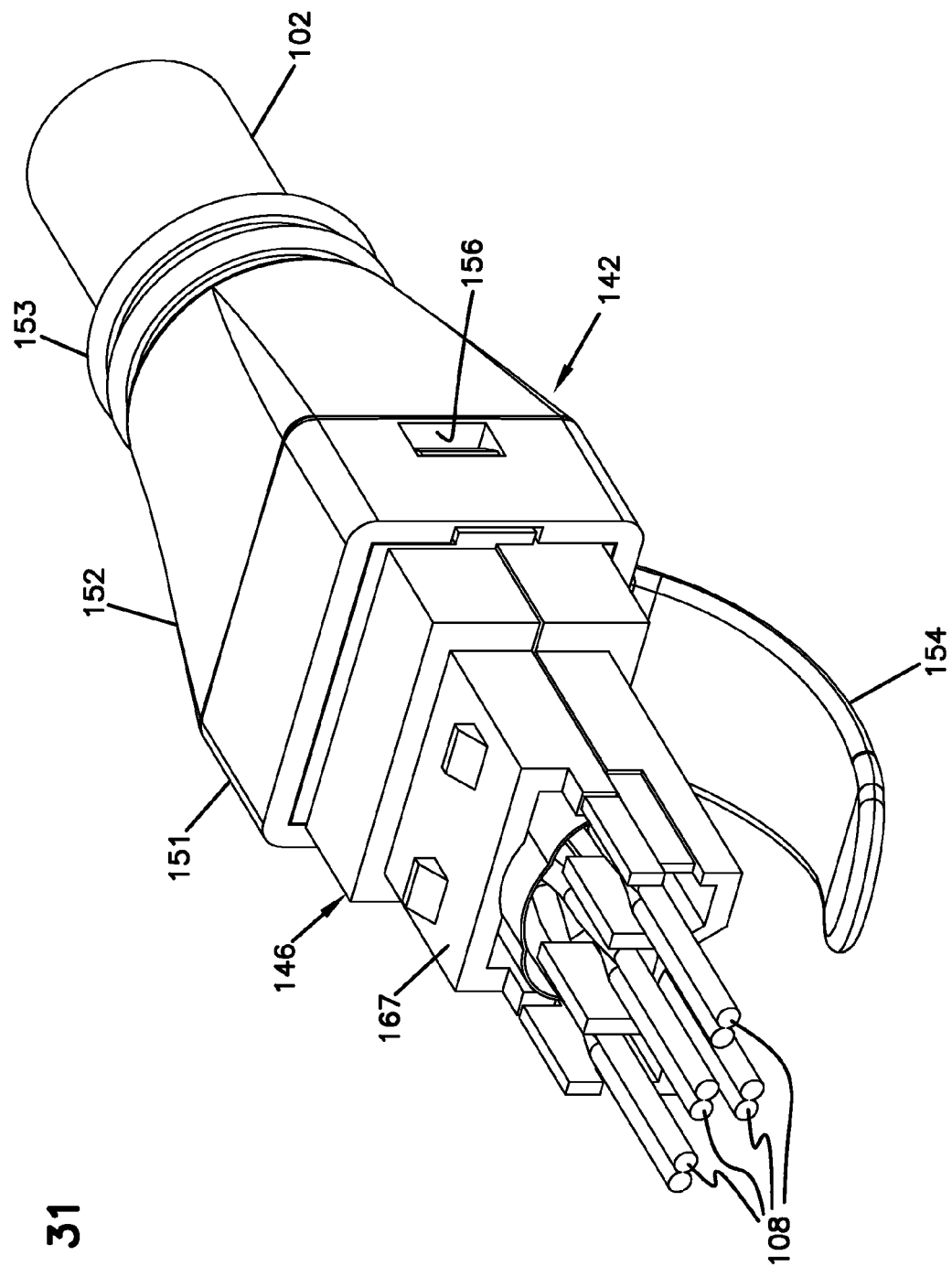
FIG. 31 is a bottom, perspective view of the partially assembled connector of FIG. 25 with the boot member latched to the wire manager.
Figure 32:
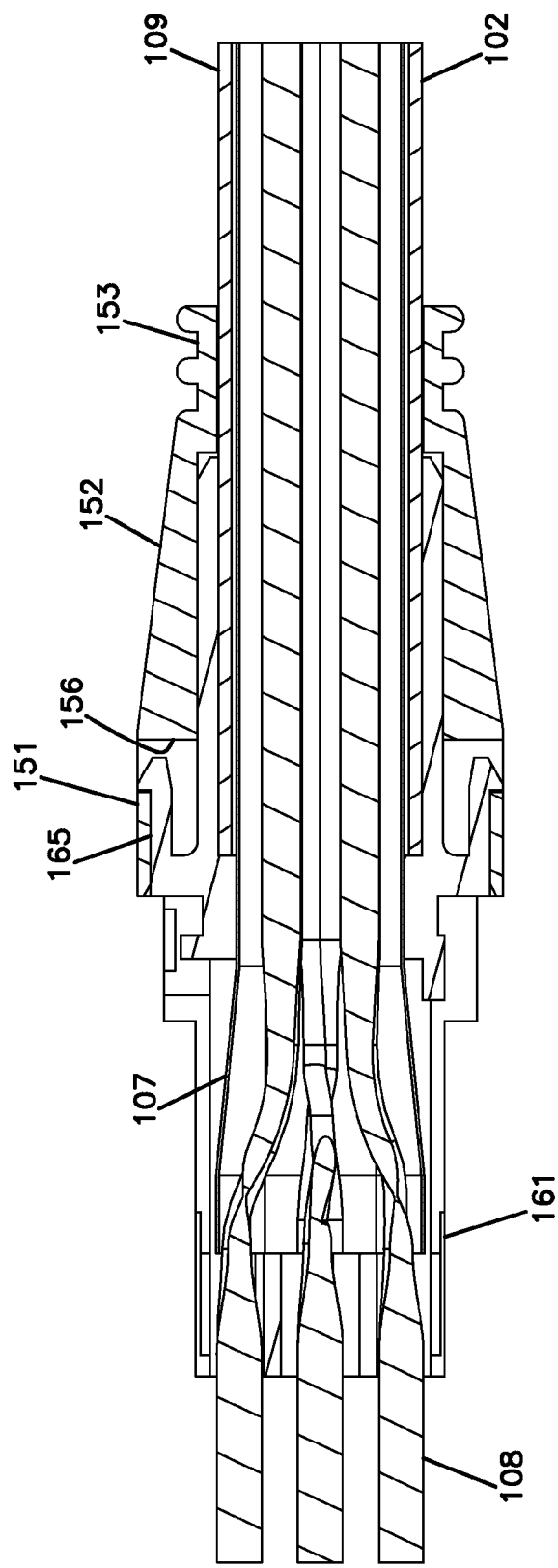
FIG. 32 is a cross-sectional view taken along the longitudinal axis of the partially assembled connector of FIG. 31 in which latching arms of the wire manager are visible.
Figure 33:
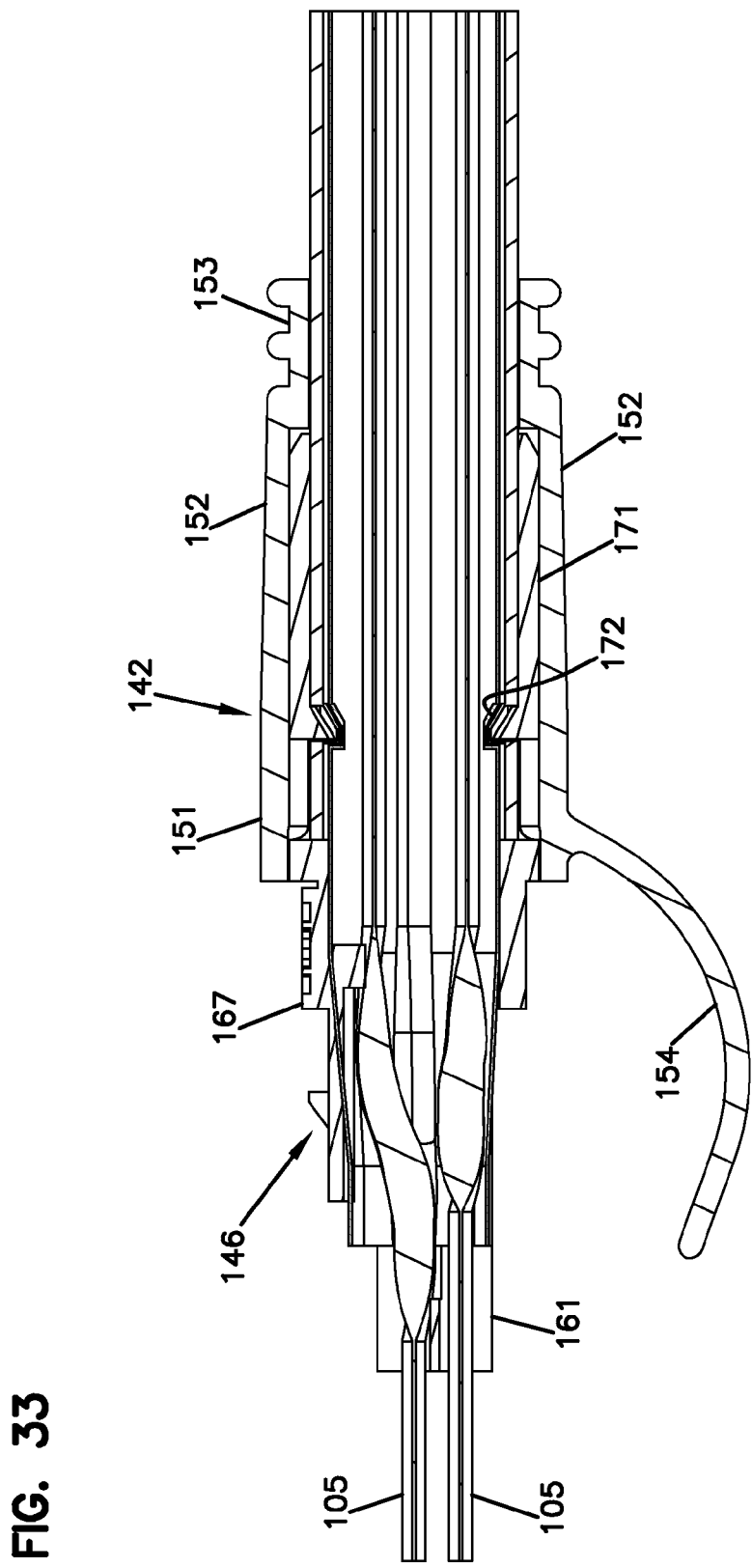
FIG. 33 is a cross-sectional view taken along the longitudinal axis of the partially assembled connector of FIG. 31 and rotated 90° from the cross-sectional view of FIG. 32 so that flexible tabs of the wire manager are visible.

As shown in FIGS. 31-33, the boot member body 150 is advanced over the retention section 162 of the wire manager body 160 until the latching arms 165 of the wire manager body 160 snap into the latching openings 156 defined in the attachment section 151 of the boot member body 150 (see FIG. 32). In certain implementations, the attachment section 151 surrounds the attachment section 164 of the wire manager body 160. In other implementations, however, the attachment section 151 of the boot member body 150 abuts against the attachment section 164 of the wire manager body 160.

The tabs 171 of the wire manager 146 are located fully within the body 150 of the boot member 142. In the example shown, the tabs 171 are located in the tapered section 152 of the boot member body 150. In other implementations, however, portions of the tabs 171 may be located within the attachment section 151. In the example shown, the wire manager body 160 has sufficiently far within the boot member body 150 that the distal end of the retention section 162 abuts the transition between the tapered section 152 and the collar section 153 of the boot member body 150. In other implementations, however, the distal end of the retention section 162 is positioned within the tapered section 152 without abutting the collar section 153.

After securing the boot member 142 to the wire manager 146, the plug nose 144 is slid over the management section 161 of the wire manager 146. In certain implementations, the wires 105 of the twisted pairs 108 are trimmed to a desired length prior to installing the plug nose 144. In some implementations, the plug nose 144 defines latching openings 145 that receive latching members 175 protruding from a top of the cover 167 of the wire manager body 160 (see FIG. 2). In other implementations, however, the plug nose 144 can be otherwise secured to the wire manager 146. In still other implementations, the plug nose 144 can be secured directly to the boot member 142. The plug nose 144 includes contacts that connect to the wires 105 of the twisted pairs 108. In certain implementations, the contacts of the plug nose 144 are insulation-displacement contacts. The plug nose 144 also defines one or more slots providing access to the contacts.

The above specification provides a complete description of the present invention. Since many embodiments of the invention can be made without departing from the spirit and scope of the invention, certain aspects of the invention reside in the claims hereinafter appended.

What is claimed is:

1. A patch cord comprising:
   a cable including twisted pairs surrounded by insulating layer; and
   a connector attached to one end of the cable, the connector including:
   a plug body;
   a sleeve disposed around the cable, the sleeve defining a first through-passage, the sleeve including at least one flexible tab having a tooth that extends into the first through-passage when the at least one flexible tab is undeflected, the flexible tab facing towards the cable; and
   a boot member defining a passage through which the cable extends, the passage being sized to press the flexible tab towards the cable to enable the boot member to fit over the sleeve, wherein the tooth bites into the insulating layer of the cable without disturbing the twisted pairs when the flexible tab is pressed towards the cable by the boot member.

2. The patch cord of claim 1, wherein the insulating layer also includes an inner jacket; and wherein the tooth of the flexible tab also bites at least partially into an inner jacket of the cable.

3. The patch cord of claim 1, wherein the at least one flexible tab extends towards the plug body.

4. The patch cord of claim 1, wherein the sleeve includes a second flexible tab located at an opposite side of the sleeve from the at least one flexible tab.

5. The patch cord of claim 1, wherein the cable initially deflects the at least one flexible tab outwardly from the first through-passage until the boot member is disposed around the sleeve.

6. The patch cord of claim 1, wherein the sleeve includes a wire manager.

7. The patch cord of claim 1, further comprising a second connector attached to an opposite end of the cable, the second connector including:
   a second plug body;
   a second sleeve disposed around the cable, the second sleeve including at least one flexible tab having a tooth that faces towards the cable; and
   a second boot member defining a passage through which the cable extends, the passage being sized to press the flexible tab of the second sleeve towards the cable to enable the second boot member to fit over the second sleeve, wherein the tooth of the second sleeve bites into the outer jacket of the cable when the flexible tab is pressed towards the cable by the second boot member.

8. The patch cord of claim 7, wherein the second connector is identical to the connector.

9. An electrical connector comprising:

a plug body;

a sleeve extends from a wire manager defining a plurality of channels, the wire manager being configured to couple to the plug body, the sleeve defining a first through-passage, the sleeve including at least one flexible tab having a tooth that extends into the first through-passage when the at least one flexible tab is undeflected; and a boot member configured to slide over the sleeve during assembly of the electrical connector, the boot member defining a second through-passage sized to press the at least one flexible tab towards the first through-passage when the boot member slides over the wire manager, the boot member inhibiting outward deflection of the at least one flexible tab when the boot member is disposed around the sleeve, wherein the sleeve and boot member are sized so that the sleeve is wholly retained within the boot member when the electrical connector is assembled.

10. The electrical connector of claim 9, wherein the wire manager includes a second flexible tab located at an opposite side of the wire manager from the at least one flexible tab.

11. The electrical connector of claim 9, wherein the at least one flexible tab extends towards the plug body.

12. The electrical connector of claim 9, wherein the wire manager includes latch members that extend towards the boot member and the boot member defines latching openings sized to receive hooks of the latch members.

13. The electrical connector of claim 12, wherein the wire manager is configured to snap-fit to the plug body.

14. A method of providing strain relief to a cable connector that terminates a cable having an outer jacket, the method comprising:

a) threading a first end of the cable through a boot member;

b) threading the first end of the cable through a through-passage defined in a sleeve and deflecting teeth of flexible tabs of the sleeve out of the through-passage, the teeth extending into the through-passage when the flexible tabs are undeflected;

c) separating out twisted pairs of the cable at a plurality of channels at the sleeve;

d) terminating the first end of the cable at a plug body and coupling the plug body to the sleeve; and e) sliding the boot member over the sleeve to deflect the distal ends of the flexible tabs back into the passage to bite into the outer jacket of the cable.

15. The method of claim 14, further comprising coupling the boot member to the sleeve.

16. The method of claim 14, wherein deflecting the teeth of the flexible tabs back into the passage causes the teeth to bite into an inner jacket of the cable.

17. The method of claim 14, further comprising performing steps (a)-(d) at a second end of the cable.

18. The method of claim 14, wherein coupling the boot member to the sleeve comprises latching the boot member to a wire manager that extends forwardly of the sleeve.

19. The method of claim 17, further comprising organizing conductors of the cable at the wire manager for insertion into the plug body.

* * * * *